United States Patent [19]

Ikezawa et al.

[11] Patent Number: 5,630,668
[45] Date of Patent: May 20, 1997

[54] THRUST NEEDLE-SHAPED ROLLER BEARING, ROLLING BEARING, AND CAGE OF THE THRUST NEEDLE-SHAPED ROLLER BEARING

[75] Inventors: Katsuhiro Ikezawa; Hiroshi Iwasa; Yasuhiro Nomura; Toshiro Kawamura; Hiroshi Narai; Takashi Nagato; Dai Kinno; Tsutomu Abe; Magozo Hamamoto; Fumio Ueki; Toshimi Takajo, all of Kanagawa, Japan

[73] Assignee: NSK Ltd., Tokyo, Japan

[21] Appl. No.: 517,097

[22] Filed: Aug. 21, 1995

[30] Foreign Application Priority Data

Aug. 19, 1994 [JP] Japan .................................. 6-217817
Oct. 14, 1994 [JP] Japan .................................. 6-275657
Jun. 19, 1995 [JP] Japan .................................. 7-175464

[51] Int. Cl.$^6$ .......................... F16C 33/56; F16C 33/62
[52] U.S. Cl. .................. 384/527; 384/573; 384/565; 384/913; 384/623
[58] Field of Search .......................... 384/523, 527, 384/572, 573, 576, 565, 569, 568, 912, 913, 492, 621, 622, 623

[56] References Cited

U.S. PATENT DOCUMENTS

| | | | |
|---|---|---|---|
| 3,740,108 | 6/1973 | Fernlund | 384/568 X |
| 4,225,200 | 9/1980 | Dougall | 384/621 |
| 4,253,714 | 3/1981 | Bhushan | 384/278 |
| 4,453,024 | 6/1984 | Tagawa et al. | 384/576 |
| 4,871,268 | 10/1989 | Furumura et al. | 384/912 X |
| 5,122,000 | 6/1992 | Matsumoto et al. | 384/492 |
| 5,271,679 | 12/1993 | Yamazumi et al. | 384/527 |

FOREIGN PATENT DOCUMENTS

| | | | |
|---|---|---|---|
| 64-79419 | 3/1989 | Japan . | |
| 2238094 | 9/1990 | Japan . | |
| 321815 | 11/1992 | Japan | 384/523 |
| 4357323 | 12/1992 | Japan . | |

*Primary Examiner*—Thomas R. Hannon
*Attorney, Agent, or Firm*—Sughrue, Mion, Zinn, Macpeak & Seas

[57] ABSTRACT

A rolling bearing includes an outer raceway, an inner raceway, a plurality of rolling elements interposed between the outer raceway and the inner raceway, and a cage for holding the rolling elements away from each other at the same interval in a rolling direction of the rolling elements, the cage including a first layer subjected to a surface treatment of at least one of carbonitriding, phosphating, sulfonitriding and gas soft nitfriding, and a second layer formed of at least one of PTFE, $MoS_2$, $WS_2$, Ag and Sn when the first layer includes a treated surface subjected to the surface treatment of phosphating. The rolling bearing can stabilize the attitude of the rolling elements and retain the ease of grinding them. At the same time, the dynamic torque of the rolling elements can be minimized while insuring to prevent the rolling elements from falling away from the cage.

10 Claims, 25 Drawing Sheets

THRUST NEEDLE-SHAPED ROLLER BEARING, ROLLING BEARING, AND CAGE OF THE THRUST NEEDLE-SHAPED ROLLER BEARING

BACKGROUND OF THE INVENTION

The present invention relates to a thrust needle-shaped roller bearing, a rolling bearing, and a cage of the thrust needle-shaped roller bearing, particularly, which are suitable under such environments as using in alternate fluorocarbon and the like.

Conventionally, a thrust needle-shaped roller bearing includes a cage and needle-shaped rollers, which are often combined with raceway rings. Needle-shaped rollers are usually of such a size that the ratio of roller length (lr) to diameter (Da) ranges from about 1.4 to 3.4 (lr/Da).

The recent concerns over global warming and other possibilities of environmental destruction have forced the manufacturers of compressors in air conditioners and the like to use alternate fluorocarbon such as HFC-134a serving as refrigerants. Compared with the conventionally used CFC-12 and other chlorofluorocarbon, the alternate fluorocarbon is inferior in self-lubricating operation. In addition, PAG (polyalkylene glycol) which is used as a working oil because of its high compatibility is characterized by the great tendency to absorb moisture.

Therefore, the use of a bearing in such an environment as the alternate fluorocarbon and PAG causes a combined operation in which, first, micro-pitting occurs due to the small amount of water entering into PAG, and secondary, the viscosity of PAG is reduced due to water absorption and the dissolution of the alternate fluorocarbon so that the lubricating conditions are deteriorated. As a result, the combined operation causes various problems provided with surface damages such as flaking, wear and the like, which lead to "seizure" of the bearing and fail to secure the required life characteristics.

In order to solve these problems, it is necessary to improve not only the corrosion resistance of the bearing material but also the lubricating conditions. A common method for assuring better corrosion resistance is of using stainless steels (e.g. SUS 440C) as the bearing material. To improve the lubricating conditions, the approach of using a modified working oil is the most effective. However, since the range of selection of working oils is limited in point of compatibility, much improvement cannot be expected in lubricity.

Under the circumstances, a method for preventing the seizure is expectable of using a large amount of lubricant in the refrigerant so as to improve its lubricity. But, this method causes another problem of deterioration in the cooling performance of the compressor. A known method that has been proposed as a technique to solve this new problem is of preventing the seizure by a surface treatment to the cage, namely by forming a plasma polymerized layer of a fluorocarbon compound on a substrate (Unexamined Japanese Patent Publication No. Hei. 2-238094).

Cages for holding the rolling elements of bearings have conventionally been formed of metals. But, metallic cages suffer the problem that they are liable to wear as the result of friction with the rolling elements, leading to shorter lives. To avoid this problem, resin cages have already been proposed in Unexamined Japanese Patent Publication Nos. Sho. 64-79419 and Hei. 4-357323. The resin cages as proposed have all parts made of resin.

In a thrust needle-shaped roller bearing, its dynamic torque can be reduced by shortening the length of each roller. However, if the rollers are made too short, several problems occur such as instability in the attitude of the rollers, their falling away from the cage, and the difficulty involved in grinding the rollers.

If stainless steels are used as bearing materials with a view of improving resistance to corrosion, the cost of bearings becomes so high that they are no longer suitable for use in compressors for vehicles. As mentioned above, the approach of improving the lubricating conditions through the use of modified working oils has not achieved sufficient effects. Further, the surface treatment (i.e., the formation of a plasma polymerized layer) proposed in Unexamined Japanese Patent Publication No. Hei. 2-238094 is not suitable for mass production without increasing the cost. In addition, uniform surface treatments can be accomplished on flat objects such as substrates, but cannot be done on objects having complicated shapes such as the cage of a bearing.

Cages all made of resin have been proposed with a view of solving the problem with metallic cages that they are liable to wear as the result of friction with rollers to thereby become short-lived. However, the resin cages are less rigid than the metal cages. Particularly, in the case where they are used in thrust needle-shaped bearings, the partitions (columns) between rollers and the outer circumferential portions that receive the end faces of the rollers are so extremely thin that creep deformation occurs due to the centrifugal force of rollers rotating at high speed.

SUMMARY OF THE INVENTION

The present invention has been accomplished under conventional circumstances and has a first object of providing a thrust needle-shaped roller bearing which can stabilize the attitude of rollers and retain the ease of grinding the rollers and which can produce the smallest possible dynamic torque on the rollers while securing to prevent the rollers from falling away from the cage.

A second object of the present invention is to provide a rolling bearing that is improved in corrosion resistance without undue increase in the production cost.

A third object of the present invention is to provide the cage of a thrust needle-shaped roller bearing that wears in a smaller amount from friction with rollers and which also is protected against creep deformation.

The first object of the present invention can be attained by a thrust needle-shaped roller bearing, in which the needle-shaped rollers have a length (lr) to diameter (Da) ratio of 1.2 to 2.0 and are each provided with crowning portions such that the length of contact with each raceway surface is no more than three fourths of the roller length (lr).

The second object of the present invention can be attained by a rolling bearing for use in an alternate fluorocarbon and a working oil, which has nitrogen contained in the surface of at least one steel member selected from among rolling elements, an inner race and an outer race.

The third object of the present invention can be attained by the cage of a thrust needle-shaped roller bearing, in which at least the areas where the cage contacts the rolling elements are partly formed of a resin.

In the thrust needle-shaped roller bearing according to the first aspect of the present invention, the ratio of the length (lr) of each needle-shaped roller to its diameter (Da) is adjusted to lie between 1.2 and 2.0 so that the dynamic torque of the rollers is made as small as possible while insuring to prevent the rollers from rotating around axes contrary to the rolling direction of the rollers or falling away from the cage. At the same time, each roller is provided with crowning portions such that the length of contact with each raceway surface is no more than three fourths of the roller length (lr). Therefore, the area of contact with the raceways is sufficiently reduced to minimize the dynamic torque of the rollers.

The rolling bearing according to the second aspect of the present invention is such that nitrogen is contained in the surface of at least one steel member selected from among rolling elements, an inner race and an outer race. This insures against pitting even if the bearing is used in such an environment as an alternate fluorocarbon and a working oil and which generates a very small amount of water. As a result, the corrosion resistance of the bearing is improved without increasing the production cost.

In the cage of thrust needle-shaped roller bearing according to the third aspect of the present invention, at least the areas where the cage contacts the rolling elements are partly formed of a resin and this is effective in assuring that the wear due to the friction with the rolling elements is reduced while preventing the occurrence of creep deformation.

DETAILED DESCRIPTION OF THE PREFERRED EMBODIMENTS

First Embodiment

Figure 1A:
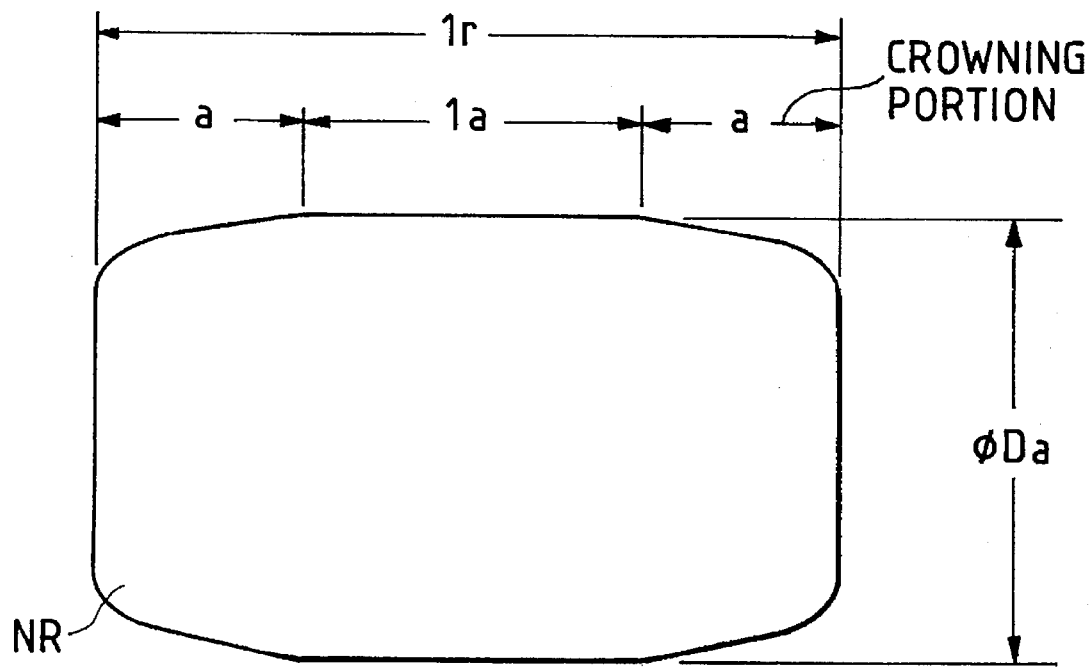
FIGS. 1A and 1B show shapes of needle-shaped rollers for use in a thrust needle-shaped roller bearing according to the first embodiment of the present invention.
Figure 1B:
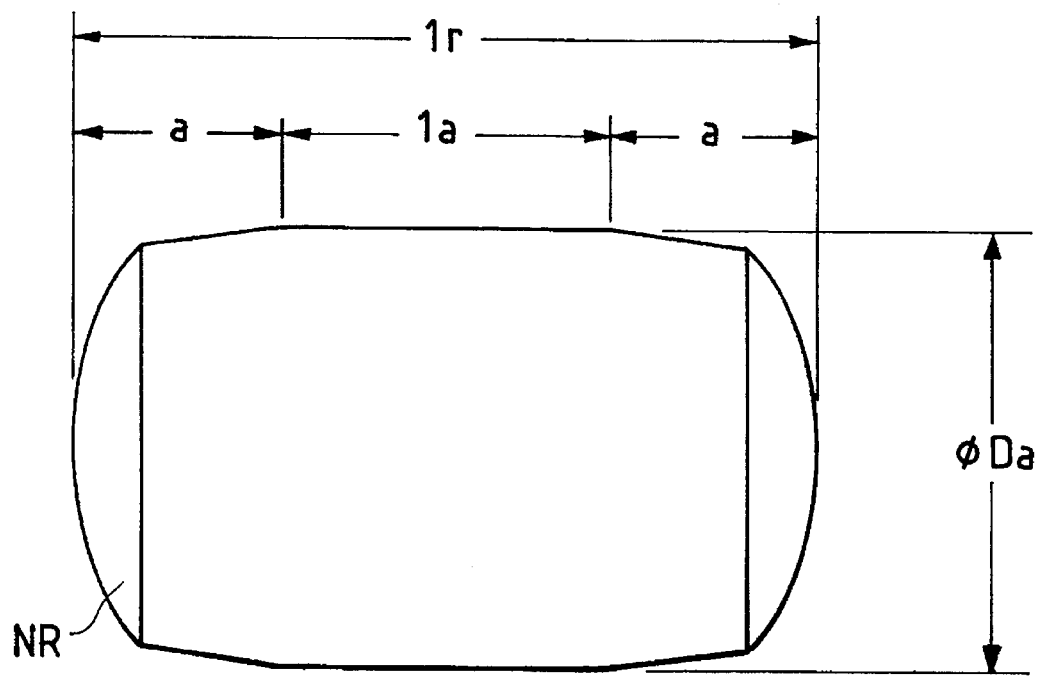

FIGS. 1A and 1B show shapes of needle-shaped rollers for use in a thrust needle-shaped roller bearing according to the first embodiment of the present invention. As shown in FIGS. 1A and 1B, the first embodiment of the present invention is characterized in that a needle-shaped roller NR having a length of lr is provided with a crowning portion of length a at both ends such that the roller contacts a mating raceway surface over a length of la which is no more than three fourths of the overall length lr. This design is effective in reducing the dynamic torque of the thrust needle-shaped roller bearing. If desired, both end faces of the needle-shaped roller NR may be arched as shown in FIG. 1B such that the end faces contact the cage over a sufficiently small area to further reduce the dynamic torque of the bearing.

Figure 2A:
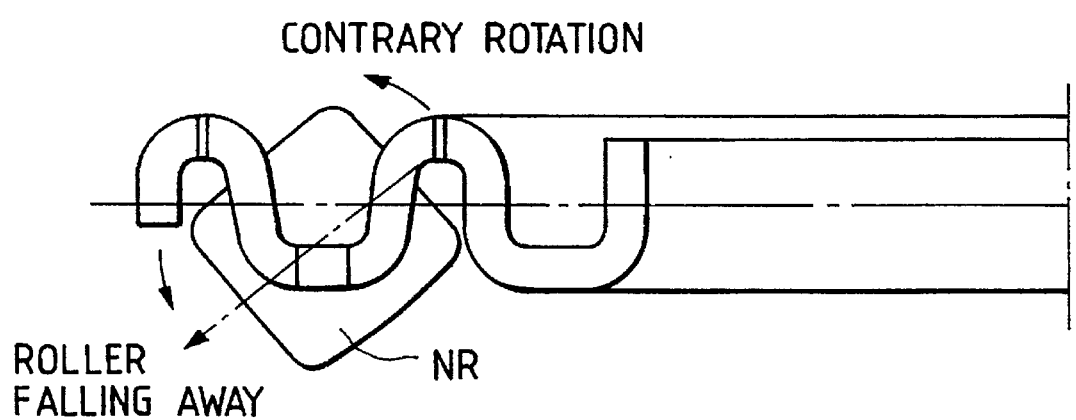
FIGS. 2A and 2B illustrate a relationship between the diameter and length of the needle-shaped roller for use in the thrust needle-shaped roller bearing of the first embodiment of the present invention.
Figure 2B:
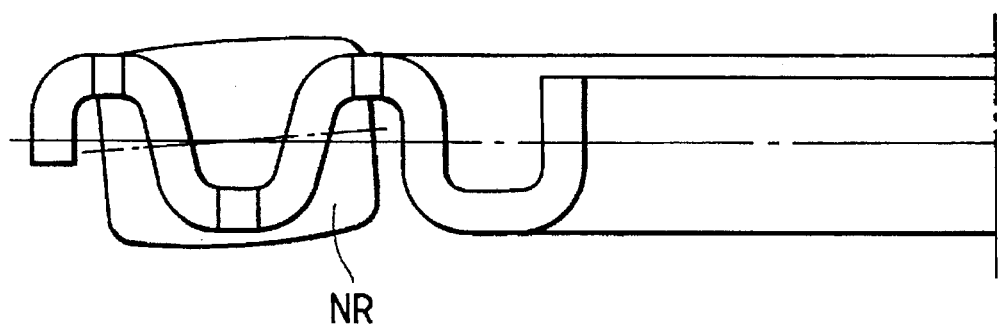

Another feature of the first embodiment of the present invention is that each needle-shaped roller NR is so shaped that the ratio of its length (lr) to diameter (Da) lies between 1.2 and 2.0 (see FIG. 2B). The dynamic torque can best be reduced by shortening the length of needle-shaped roller NR. However, if its length to diameter ratio (lr/Da) is made smaller than 1.2, the roller NR rotates around axes contrary to the rolling direction of the rollers or falls away from the cage as illustrated in FIG. 2A. In addition, it becomes difficult to grind the roller.

Figure 3:
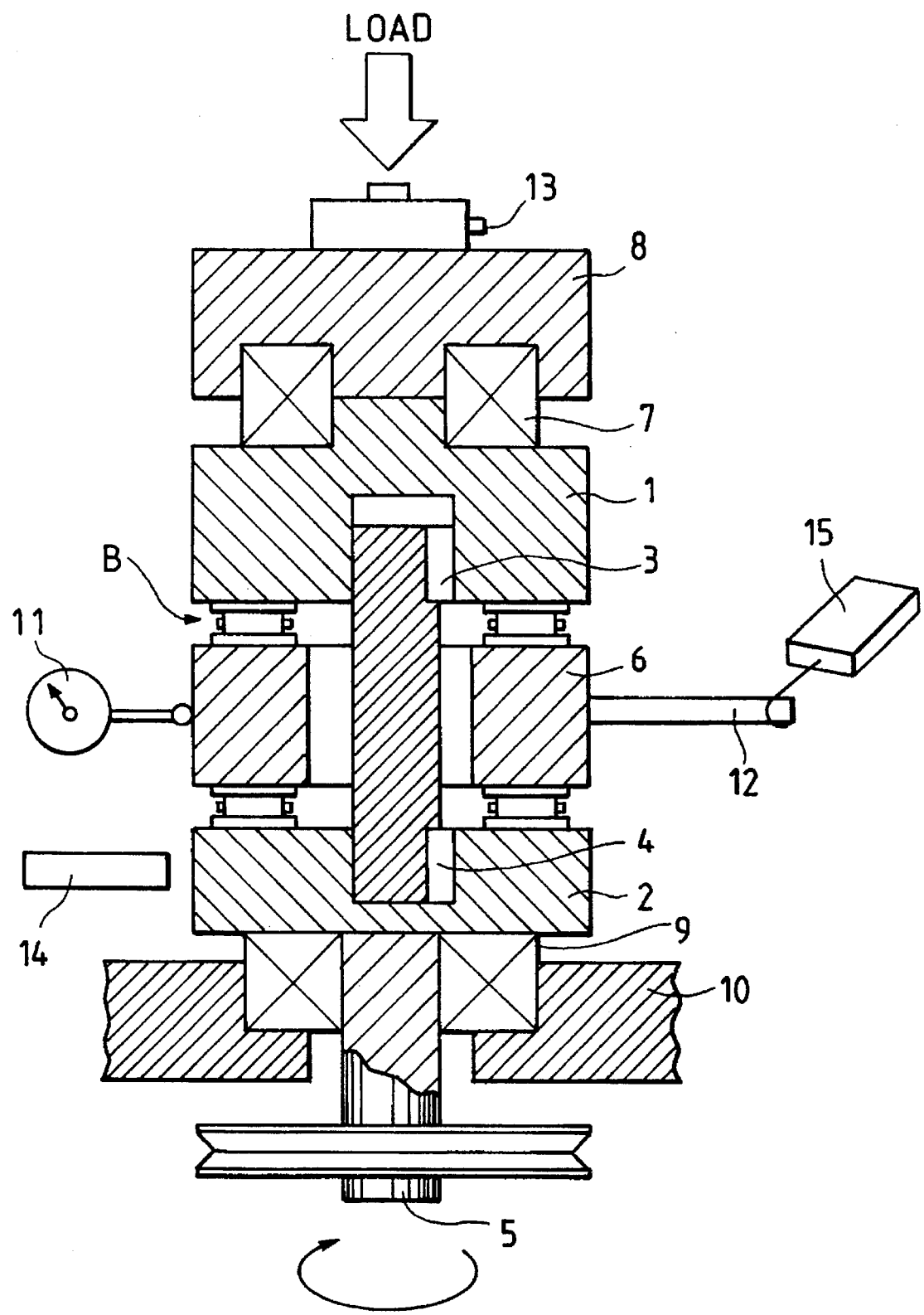
FIG. 3 is schematic representation of an apparatus that was used to measure the dynamic torque of the thrust needle-shaped roller bearing of the first embodiment of the present invention.

To demonstrate the criticality of the above-described dimensional features of the needle-shaped roller NR, dynamic torque measurements were conducted with a testing apparatus of the type shown in FIG. 3.

The testing apparatus has the first rotating body 1 and the second rotating body 2, both the bodies engaging a rotating shaft 5 by keys 3 and 4, respectively, and rotating together with the shaft 5. A first fixed portion 6 is interposed between the first rotating body 1 and the second rotating body 2. The testing apparatus is so adapted that each of thrust needle-shaped roller bearings B which are subjected to tests is placed between the first rotating body 1 and the first fixed portion 6, and also between the second rotating body 2 and the first fixed portion 6. The first rotating body 1 is supported on a second fixed portion 8 by a bearing 7. The second rotating body 2 is supported on a third fixed portion 10 by a bearing 9.

The first fixed portion 6 is fitted with a dial gauge 11 and a torque detecting load cell 12. The second fixed portion 8 is fitted with a thrust load detecting load cell 13. The second rotating body 2 is fitted with a tachometer 14. The torque detecting load cell 12 is connected to a pen recorder 15.

Using the testing apparatus shown in FIG. 3, samples of thrust needle-shaped roller bearings with a diameter (Dm) of 42 mm including needle-shaped rollers with a diameter (Da) of 2 mm were subjected to dynamic torque measurements under a load of 1,500 kgf. The test results were as shown in Table 1.

TABLE 1

|  | lr/Da | Relative contact length | Dynamic torque, kgf-cm |
| --- | --- | --- | --- |
| Example 1 | 2.0 | ¾ lr | 8–8.2 |
| Example 2 | 1.4 | ¾ lr | 8–8.3 |
| Example 3 | 2.0 | ¼ lr | 8.2–8.5 |
| Example 4 | 1.4 | ¼ lr | 8–8.5 |
| Comparative Example 1 | 3.0 | ¾ lr | 12–12.5 |
| Comparative Example 2 | 1.1 | ¾ lr | 8–9 |
| Comparative Example 3 | 2.0 | lr | 12–13 |
| Comparative Example 4 | 2.0 | ⅛ lr | 9–12 |

In Example 1 where the ratio (lr/Da) of roller length lr to roller diameter Da was 2.0 and the length of contact (la) was ¾ lr, the dynamic torque was measured to be 8 to 8.2 kgf-cm; in Example 2 where lr/Da was 1.4 and the length of contact (la) was ¾ lr, the dynamic torque was 8 to 8.3 kgf-cm; Example 3 where the ratio of lr/Da was 2.0 and the length of contact (la) was ¼ lr, the dynamic torque was 8.2 to 8.5 kgf-cm; and in Example 4 where lr/Da was 1.4 and the length of contact (la) was ¼ lr, the dynamic torque was 8 to 8.5 kgf-cm; thus, in each of Examples 1 to 4, the dynamic torque was found to be less than the acceptable level 9.0 kgf-cm.

In Comparative Example 1 where lr/Da was 3.0 and the length of contact (la) was ¾ lr, the dynamic torque was measured to be 12 to 12.5 kgf-cm, which was unacceptably high; in Comparative Example 2 where lr/Da was 1.1 and the length of contact (la) was ¾ lr, the dynamic torque was acceptably low (8 to 9 kgf-cm) but the lr/Da level which was 1.1 suggests the potential difficulty in grinding rollers; in Comparative Example 3 where lr/Da was 2.0 and the length of contact (la) was equal to lr (i.e., no crowning portions were formed), the dynamic torque was found to be unacceptably high (12 to 13 kgfcm); in Comparative Example 4 where lr/Da was 2.0 and the length of contact (la) was ⅛ lr, the dynamic torque varied greatly between 9 and 12 kgf-cm. In addition, the contact length (la) which was ⅛ lr suggests the possibility that the attitude of needle-shaped rollers would become very unstable.

Using the testing apparatus shown in FIG. 3, three samples of thrust needle-shaped roller bearing (Dm=42 mm; Da=2 mm) were subjected to dynamic torque measurements under varying loads: the first sample had a lr/Da value of 1.9 (lr=3.8 mm) and incorporated needle-shaped rollers without crowning portions; the second sample had a lr/Da value of 1.9 (lr=3.8 mm) and incorporated crowning portions having a length of at least of 0.95 mm (the length of contact with a raceway surface was no more than three fourths of the overall roller length (3.8 mm); and the third sample had a lr/Da value of 1.0 (lr=2.0 mm) and incorporated needle-shaped rollers without crowning portions. The results were as shown in FIG. 4.

Figure 4:
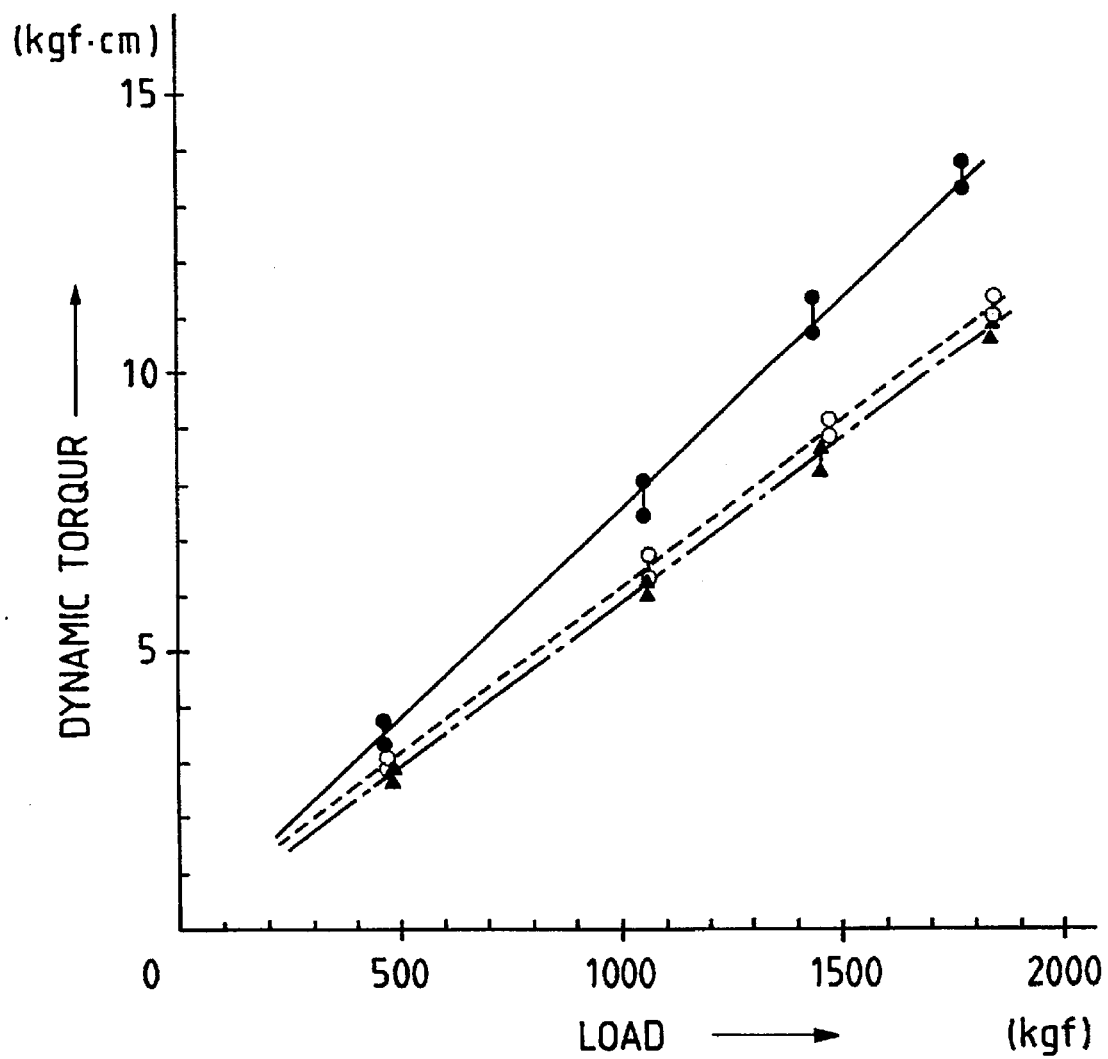
FIG. 4 is a graph showing the results of dynamic torque measurements that were conducted with the apparatus shown in FIG. 3 under varying loads on thrust needle-shaped roller bearings using needle-shaped rollers of various configurations.

A solid line in FIG. 4 refers to the result of measurement on the first bearing sample, a broken line refers to the second sample, and a one-dot broken line refers to the third sample.

Obviously, the first sample using rollers with no crowning portions produced great dynamic torques although the lr/Da value was comparatively small at 1.9. The third sample also using rollers with no crowning portions produced smaller dynamic torques since lr/Da was 1.0 and the roller length (lr) was as short as 2.0 mm. Nevertheless, the rollers would rotate as shown in FIG. 2A or otherwise exhibit instability in attitude. On the other hand, the second sample did not exhibit any instability in the attitude of rollers although it produced dynamic torques slightly greater than those which occurred in the third sample.

On the basis of these data, it is concluded that the needle-shaped rollers for use in the thrust needle-shaped roller bearing according to the first embodiment of the present invention should have a length (lr) to diameter (Da) ratio of 1.2 to 2.0 and should also have crowning portions formed such that the length of contact (la) with a mating raceway surface is no more than three fourths of lr. If the bearing according to the first embodiment of the present invention is to be used in such an environment as an alternate fluorocarbon and a working oil, the cage is desirably borne not by rollers but by races in order to prevent the rollers from being damaged.

Second Embodiment

The present inventors studied various methods for the purpose of making bearing materials more resistant to the corrosion that would produce due to the water generated in an environment provided with an alternate fluorocarbon such as HFC (hydrofluorocarbon) and with PAG (polyalkylene glycol). As a result, it has been found that incorporating a certain amount of nitrogen in the surface of bearing steels is effective for the above purpose.

Figure 5A:
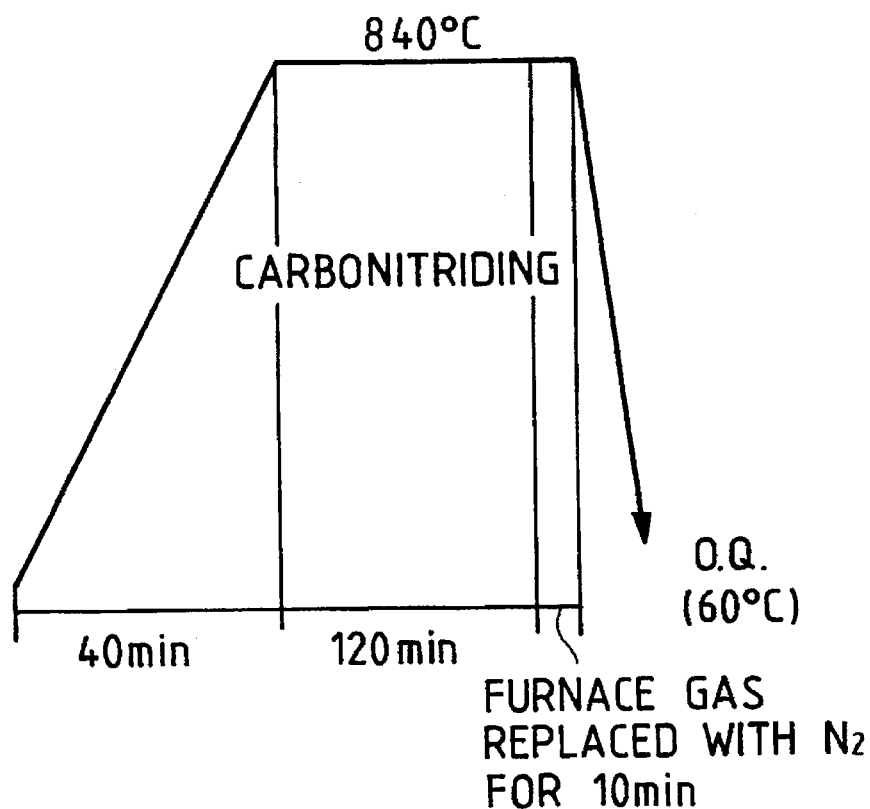
FIGS. 5A and 5B illustrate methods of incorporating nitrogen in the second embodiment of the present invention.
Figure 5B:
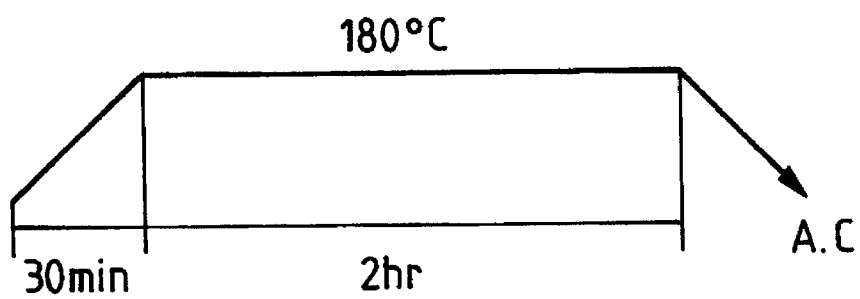

The experiment was conducted in the following manner. First, an inner and an outer race (i.e., an upper and a lower race) and rolling elements that were made of SUJ 2 were subjected to a carbonitriding treatment at 840° C. in an atmosphere containing endothermic, enrich and ammonia gases according to the profile shown in FIG. 5A; thereafter, the members were tempered at 180° C. for 2 h according to the profile shown in FIG. 5B. The content of surface nitrogen was adjusted by changing the ammonia concentration. The bearing material SUJ 2 may be replaced by low-alloy steels in the class of non-stainless steels, such as case hardening steels.

For smaller friction, the following surface treatments were conducted. The cage was first primed by subjecting its surface to a phosphating treatment to give a film thickness of 5 μm.

The prime coat was overlaid with a baked film of molybdenum disulfide ($MoS_2$) and polytetrafluoroethylene (PTFE) in a thickness of 15 μm with polyamideimide being used as a binder. The phosphating treatment as prime coating may be replaced by sulfurization, sulfonitriding or gas soft nitfriding. If desired, these priming treatments may be preceded by a carburizing or carbonitriding treatment. Further, Molybdenum disulfide and polytetrafluoroethylene may be used individually. For higher resistance to seizure, it is also effective to plate or otherwise provide a solid lubricant layer of a metal such as Ag or Sn after the priming.

The synthetic resin to be used as a binder is in no way limited to polyamideimide but may be replaced by epoxies and other thermosetting resins. The surface treatments described above which are performed by baking solid lubricants or in other ways for achieving lower friction may be applied not only to the cage but also to at least one member selected from among rolling elements, an inner race and an outer race. The phosphating treatment as priming may be replaced by the single use of a lubricating film that is formed by either sulfurization, sulfonitriding or gas soft nitriding. Alternatively, either carburization or carbonitriding is first applied and, thereafter, either sulfurization, sulfonitriding or gas soft nitriding may be applied to form a lubricating film. Modifications of these surface treatments of the bearing cage according to the second embodiment of the present invention will be described in detail after the description of examples of the third embodiment of the present invention.

Figure 6:
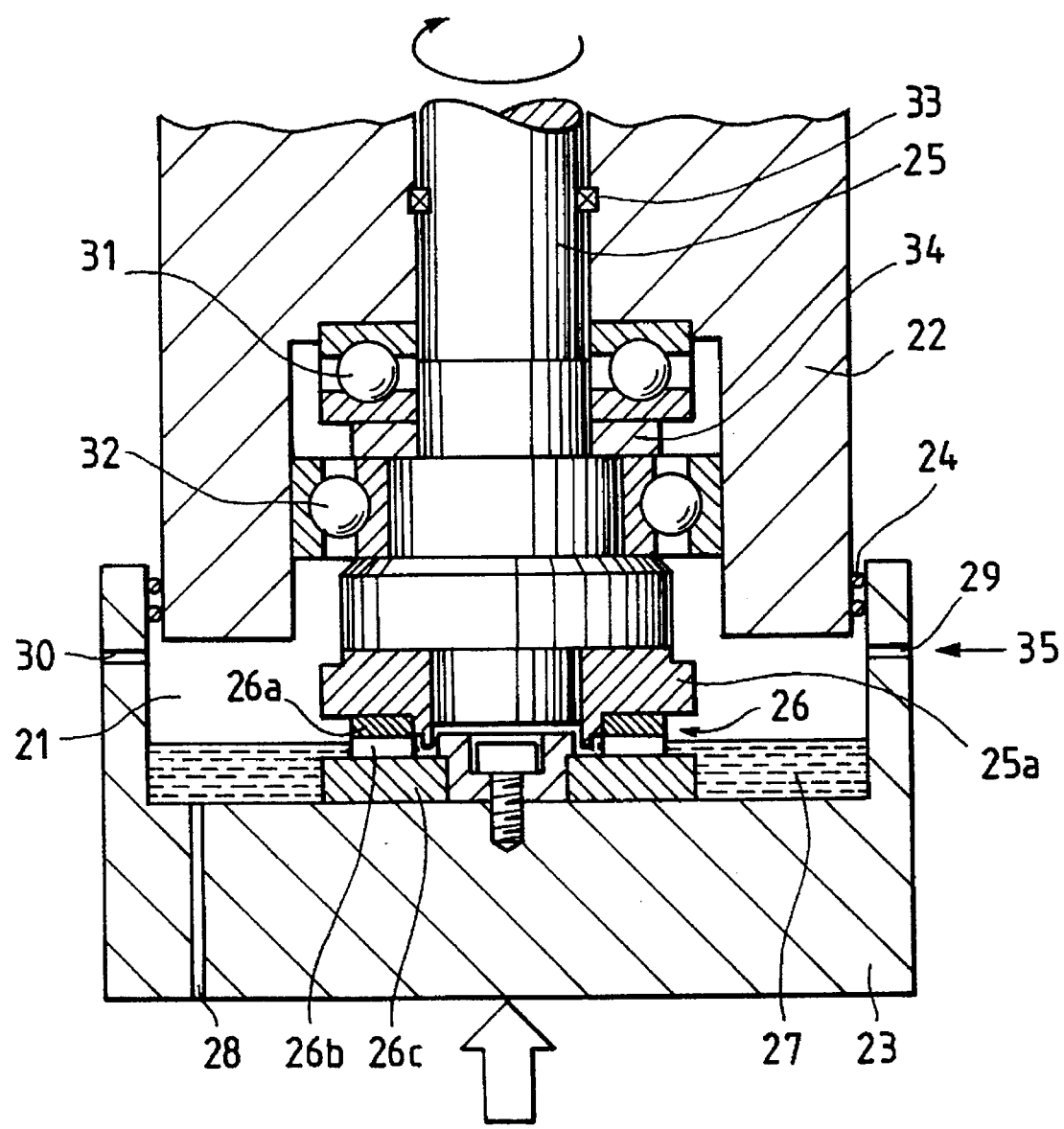
FIG. 6 is a schematic representation of a tester that was used to evaluate the life of the bearing according to the second embodiment of the present invention.

FIG. 6 is a schematic representation of a tester for evaluating the service life of bearings. The tester was adapted from the thrust-type bearing steel life tester described in "Tokushuko Binran (Handbook of Specialty Steels)", First Edition, compiled by Denki Seikosho, published on May 25, 1969, section 10, page 21; a test chamber was filled with an alternate fluorocarbon and a test section was sealed gas-tightly.

More specifically, a test chamber 21 is adapted to form a gas-tight space that is defined by an upper fixed portion 22 having a concave in the bottom and a lower fixed portion 23 having a concave in the top, the two portions being tightly engaged by an O-ring 24. As a result, a spindle 25 is supported on the upper fixed portion 22 and the lower fixed portion 23. A test sample (bearing) 26 can be positioned between the underside of a rotating disk portion 25a fitted on the spindle 25 and the top side of the lower fixed portion 23. Further, the supporting of the spindle 25 is secured by a thrust bearing 31, a radial bearing 32, a seal 33, and an interposed seat 34.

Further referring to FIG. 6, the bearing includes the upper race 26a, the rollers and the cage 26b, and the lower race 26c. A lubricant 27 is supplied into the test chamber 21 via a channel 28. The alternate fluorocarbon 35 such as HFC-134a is introduced via an inlet 29 and discharged through an outlet 30 by a vacuum pump so that the test chamber 21 is filled with the alternate fluorocarbon. Thereafter, the inlet 29 and outlet 30 are closed by shutting off valves.

Using the tester described above, samples of thrust needle-shaped bearing were tested under the following conditions: Pmax=2,000 MPa; N=4,900 cpm; atmosphere= HFC-134a (one atm.); lubricant=PAG (VG 48; containing 3% $H_2O$). The results were as shown in Tables 2 and 3. In preparing the test samples, all of the heat treated specimens were ground on one side to a depth of 0.15 mm. The life of each test sample was regarded as having come to an end when the vibration of the test area 21 reached twice the initial value.

The test results shown in Tables 2 and 3 are reviewed as follows. Sample Nos. 1 to 3 were not subjected to a surface treatment and their surface roughness value 0.1 Ra was not very good. But, these samples contained surface nitrogen in amounts of 0.09% or more. Accordingly, although peeling occurred in these samples and they exhibited much wear, these samples were free from pitting and flaking, and could secure a service life of at least $10 \times 10^6$ revolutions (rpm). Sample No. 4 was also not subjected to a surface treatment. In addition, the content of surface nitrogen was as small as 0.07% and its surface roughness value 0.1 Ra was not very good. Accordingly, not only peeling but also pitting and flaking occurred in this sample and it exhibited much wear, having a service life of only $1 \times 10^6$ revolutions. Sample No. 5 was also not subjected to a surface treatment and its surface roughness value 0.1 Ra was not very good. However, it contained as much as 0.6% of surface nitrogen. Accordingly, although peeling occurred in this sample and it exhibited much wear, it was free from pitting and flaking, and could secure a service life of $13 \times 10^6$ revolutions. Nevertheless, the surface nitrogen content as high as 0.6% causes lower efficient of grinding operations and a higher production cost.

TABLE 2

| Sample No. | Surface N content, % | Surface treatment | Surface roughness, Ra | Service Life | Pitting | Flaking | Peeling | Wear |
|---|---|---|---|---|---|---|---|---|
| 1 | 0.49 | No | 0.1 | $10 \times 10^6$ | No | No | Yes | High |
| 2 | 0.3 | No | 0.1 | $11 \times 10^6$ | No | No | Yes | " |
| 3 | 0.09 | No | 0.1 | $12 \times 10^6$ | No | No | Yes | " |
| 4 | 0.07 | No | 0.1 | $1 \times 10^6$ | Yes | Yes | Yes | " |
| 5 | 0.6 | No | 0.1 | $13 \times 10^6$ | No | No | Yes | " |
| 6 | 0.03 | Yes | 0.1 | $6 \times 10^6$ | Yes | Yes | Yes | Low |
| 7 | 0.03 | No | 0.1 | $1 \times 10^6$ | Yes | Yes | Yes | High |
| 8 | 0.48 | Yes | 0.08 | $30 \times 10^6$ | No | No | Yes | Low |
| 9 | 0.3 | Yes | 0.09 | $22 \times 10^6$ | No | No | Yes | " |
| 10 | 0.09 | Yes | 0.1 | $23 \times 10^6$ | No | No | Yes | " |
| 11 | 0.3 | No | 0.1 | $10 \times 10^6$ | No | No | Yes | High |
| 12 | 0.05 | Yes | 0.1 | $5 \times 10^6$ | Yes | Yes | Yes | Low |

TABLE 2-continued

| Sample No. | Surface N content, % | Surface treatment | Surface roughness, Ra | Service Life | Pitting | Flaking | Peeling | Wear |
| --- | --- | --- | --- | --- | --- | --- | --- | --- |
| 13 | 0.47 | No | 0.03 | $30 \times 10^6$ | No | No | No | High |
| 14 | 0.3 | No | 0.03 | $20 \times 10^6$ | No | No | No | " |
| 15 | 0.1 | No | 0.03 | $21 \times 10^6$ | No | No | No | " |
| 16 | 0.3 | No | 0.05 | $23 \times 10^6$ | No | No | No | " |
| 17 | 0.3 | No | 0.03 | $22 \times 10^6$ | No | No | No | " |
| 18 | 0.3 | No | 0.01 | $25 \times 10^6$ | No | No | No | " |
| 19 | 0.3 | No | 0.08 | $10 \times 10^6$ | No | No | Yes | " |
| 20 | 0.07 | No | 0.01 | $5 \times 10^6$ | Yes | Yes | No | " |

TABLE 3

| Sample No. | Surface N content, % | Surface treatment | Surface roughness, Ra | Service Life | Pitting | Flaking | Peeling | Wear |
| --- | --- | --- | --- | --- | --- | --- | --- | --- |
| 21 | 0.03 | Yes | 0.03 | $10 \times 10^6$ | Yes | Yes | No | Low |
| 22 | 0.03 | Yes | 0.05 | $10 \times 10^6$ | Yes | Yes | No | " |
| 23 | 0.03 | Yes | 0.03 | $10 \times 10^6$ | Yes | Yes | No | " |
| 24 | 0.03 | Yes | 0.01 | $10 \times 10^6$ | Yes | Yes | No | " |
| 25 | 0.03 | Yes | 0.07 | $5 \times 10^6$ | Yes | Yes | Yes | " |
| 26 | 0.03 | No | 0.05 | $5 \times 10^6$ | Yes | Yes | No | High |
| 27 | 0.49 | Yes | 0.03 | $70 \times 10^6$ | No | No | No | Low |
| 28 | 0.3 | Yes | 0.03 | $53 \times 10^6$ | No | No | No | " |
| 29 | 0.09 | Yes | 0.03 | $50 \times 10^6$ | No | No | No | " |
| 30 | 0.3 | Yes | 0.03 | $51 \times 10^6$ | No | No | No | " |
| 31 | 0.3 | Yes | 0.03 | $55 \times 10^6$ | No | No | No | " |
| 32 | 0.3 | Yes | 0.03 | $56 \times 10^6$ | No | No | No | " |
| 33 | 0.3 | Yes | 0.05 | $53 \times 10^6$ | No | No | No | " |
| 34 | 0.3 | Yes | 0.03 | $52 \times 10^6$ | No | No | No | " |
| 35 | 0.3 | Yes | 0.01 | $55 \times 10^6$ | No | No | No | " |
| 36 | 0.3 | Yes | 0.07 | $20 \times 10^6$ | No | No | Yes | " |
| 37 | 0.3 | No | 0.03 | $20 \times 10^6$ | No | No | No | High |
| 38 | 0.07 | Yes | 0.03 | $10 \times 10^6$ | Yes | Yes | No | Low |

Sample No. 6 had a surface nitrogen content as small as 0.03% and its surface roughness value 0.1 Ra was not very good but it was subjected to a surface treatment. Therefore, despite the occurrence of peeling, pitting and flaking, the sample exhibited less wear and could secure a service life of $6 \times 10^6$ revolutions. Sample No. 7 also had a surface nitrogen content as small as 0.03% and its surface roughness value 0.1 Ra was not very good. In addition, it was not subjected to a surface treatment. Therefore, not only did peeling, pitting and flaking occur but the sample also exhibited much wear, exhibiting a service life of only $1 \times 10^6$ revolutions.

Sample Nos. 8 to 10 has surface roughness values of 0.08 Ra and more, which were not very good, but they contained surface nitrogen in amounts of 0.09% and more and were subjected to a surface treatment. Therefore, although peeling occurred, pitting and flaking did not occur and the samples exhibited small wear to secure a service life of at least $22 \times 10^6$ revolutions.

Sample No. 11 was not subjected to a surface treatment and its surface roughness value 0.1 Ra was not very good but its surface nitrogen content was at least 0.3%. Therefore, although peeling occurred in this sample and it exhibited much wear, it was free from pitting and flaking, and could secure a service life of $10 \times 10^6$ revolutions. Sample No. 12 had a surface nitrogen content of as low as 0.05% and its surface roughness value 0.1 Ra was not very good, either, but it was subjected to a surface treatment. Therefore, despite the occurrence of peeling, pitting and flaking, this sample exhibited less wear and could secure a service life of minimum $5 \times 10^6$ revolutions.

Sample Nos. 13 to 18 were not subjected to a surface treatment but they contained surface nitrogen in amounts of 0.1% and more and their surface roughness values were satisfactory at 0.05 Ra and less. Therefore, despite the occurrence of much wear, those samples were free from pitting, flaking and peeling, and could secure a service life of at least $20 \times 10^6$ revolutions. Sample No. 19 was not subjected to a surface treatment and its surface roughness value 0.08 Ra was not very good but it had a surface nitrogen content of 0.3%. Therefore, although peeling occurred and the sample exhibited much wear, neither pitting nor flaking occurred and the sample could secure a service life of $10 \times 10^6$ revolutions. Sample No. 20 had a surface nitrogen content of as low as 0.07% and it was not subjected to a surface treatment, either, but its surface roughness value 0.01 Ra was satisfactory. Therefore, despite the occurrence of pitting and flaking accompanied by extensive wear, the formation of an oil film was so much promoted as to prevent the occurrence of peeling, and could secure a service life of minimum $5 \times 10^6$ revolutions, Sample No. 21 to 24 contained surface nitrogen in all amount as low as 0.03% but they were subjected to a surface treatment and their surface roughness values were satisfactory at 0.05 Ra and below. Therefore, despite the occurrence of pitting and flaking, these samples were free from peeling and they exhibited only small wear to secure a service life of $10 \times 10^6$ revolutions. Sample No. 25 contained surface nitrogen in an amount as low as 0.03% and its surface roughness value 0.07 Ra was not very good but its was subjected to a surface treatment. Therefore, despite the occurrence of pitting, flaking and peeling, the sample exhibited only small wear and could secure a service life of minimum $5\times10^6$ revolutions. Sample No. 26 had a surface nitrogen content as low as 0.03% and was not subjected to a surface treatment but its surface roughness value 0.05 Ra was satisfactory. Therefore, despite the occurrence of pitting and flaking accompanied by extensive wear, the formation of an oil film was promoted to prevent the occurrence of peeling and the sample could secure a service life of minimum $5\times10^6$ revolutions.

Sample Nos. 27 to 35 contained surface nitrogen in amounts of 0.09% and more and not only were they subjected to a surface treatment but they also had satisfactory surface roughness levels of 0.05 Ra and below. Therefore, they were free from pitting, flaking and peeling and exhibited only small wear to secure a service life of at least $50\times10^6$ revolutions. Sample No. 36 had a surface roughness value of 0.07 Ra which was not very good but it had a surface nitrogen content as high as 0.3% and it was subjected to a surface treatment. Therefore, despite the occurrence of peeling, the sample was free from pitting and flaking and exhibited only small wear to secure a service life of at least $20\times10^6$ revolutions. Sample No. 37 was not subjected to a surface treatment but it contained as much as 0.3% surface nitrogen and its surface roughness value 0.03 Ra was acceptably low. Therefore, despite the occurrence of great wear, the sample was free from pitting, flaking and peeling, and could secure a service life of $20\times10^6$ revolutions. Sample No. 38 contained only 0.07% of surface nitrogen but it was subjected to a surface treatment and had a satisfactory surface roughness level at 0.03 Ra. Therefore, despite the occurrence of pitting and flaking, the sample was free from peeling and exhibited only small wear, and could secure a service life of $10\times10^6$ revolutions.

Thus, the life of rolling bearings can be extended even in such an environment as an alternate fluorocarbon and a water-containing lubricant by one of the following points: controlling the concentration of surface nitrogen as appropriate for preventing the occurrence of pitting and flaking; controlling the surface roughness as appropriate for promoting the formation of an oil film to prevent the occurrence of peeling; or applying a surface treatment that reduces friction such that the presence of the surface coating or otherwise protecting films prevents contact with metals even if pitting causes a broken oil film. In these cases, the foregoing test data indicate that the concentration of surface nitrogen is desirably adjusted to lie between 0.08 and 0.5% whereas the surface roughness is desirably adjusted to be no more than 0.05 Ra. The upper limit of the concentration of surface nitrogen is set to 0.5% because higher values do not contribute to any significant extension of the service life of the bearing and, on the contrary, the grindability of the bearing material deteriorates to increase the production cost of the bearing.

In the test described above, the surface treatment such as by the baking of solid lubricants for achieving lower friction was applied only to the cage but almost comparable results were attained even when said surface treatment was applied to at least one other member of the bearing selected from among the rolling elements, the inner race and the outer race.

Figure 21A:
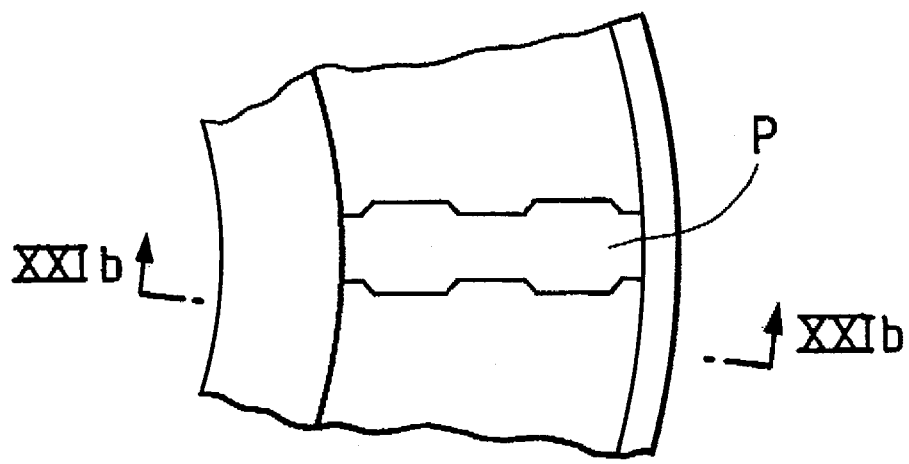
FIGS. 21A and 21B show a conventional cage which is made of a cold rolling steel sheet.
Figure 21B:

There are described several modifications of the surface treatment of interest with particular reference made to the cage. In the following description, the cage was made from a cold rolling steel sheet (SPCC) and shaped as shown in FIGS. 21A and 21B. However, this is not the sole case of the present invention and the cage may be formed not by rolling but by cutting various other steels and metals (preferably those which are corrosion resistant).

Surface treatments of the kind under consideration are roughly classified as:

(A) applying a prime coat, which is overlaid with a coating of solid lubricant, as implemented in the above-described test on thrust needled-shaped roller bearings; and (B) forming on the surface of an iron substrate a compound of the matrix iron, nitrogen and carbon, or a compound of iron, nitrogen, carbon and sulfur (carbon may be omitted in both cases).

As for (A), the following description is directed to the case of forming a solid lubricant coat from polytetrafluoroethylene (PTFE) with polyamideimide being used as a binder. However, as already mentioned, PTFE may be replaced by other solid lubricants including molybdenum ($MoS_2$) and tungsten disulfide ($WS_2$), one of which may be used in admixture with PTFE. The binder also is not limited to any particular type and polyamideimide, epoxies and other resins may be selected as appropriate. Whichever of these solid lubricants and binders may be used, the results are comparable to the test data as set forth in below.

The priming for the application of the solid lubricants mentioned above may be effected by (1) carburization or carbonitriding, (2) sulfurization or sulfonitriding, (3) gas soft nitriding, (4) phosphating (e.g., coating with manganese phosphate or zinc phosphate), which may be performed individually, or (5) primary treatment (1) which is combined with at least one of secondary treatments (2), (3) and (4). If desired, the priming (1), (2), (3) or (5) may be followed by treatment (4).

The phosphate coating formed by the treatment (4) has surface asperities that provide an increased area of contact with the overlying solid lubricant and binder layer, whereby it combines with the binder so strongly as to enhance the adhesion between the solid lubricant and the substrate surface. An experiment with manganese phosphate coating revealed that in order to insure the above-described advantage of the phosphating treatment, the thickness of the phosphate coat is preferably in the range from 4 to 10 μm. If the coating thickness is less than 4 μm, the surface asperities formed are insufficient to provide satisfactory adhesion between the solid lubricant and the substrate surface. If the coating thickness exceeds 10 μm, the surface of the coating becomes so rough that even if it is overlaid with a coating of solid lubricant, it remains rough and the lubricating conditions deteriorate as exemplified by a broken oil film on the surface face of a cage made out of a material which is subjected to the phosphating treatment (4). In addition, the dimensional tolerances of the cage also deteriorate. Therefore, in the examples under consideration, the thickness of the phosphate coating is limited to lie between 4 and 10 μm. While priming can be accomplished by other methods prior to the application of solid lubricants as will be described later in this specification, specific reference is made here to carbonitriding as a typical example of the priming methods.

As for (B), or the second type of surface treatments under consideration, the layer of a compound of iron and nitrogen may be formed by gas soft nitriding, and the layer of a compound of iron, nitrogen and sulfur may be formed by sulfonitriding, and carbon may be added to either compound by the combination of a primary carburizing or carbonitriding treatment with a subsequent, secondary gas soft nitriding treatment (or sulfonitriding treatment); either of these methods is effective in reducing the wear of the cage. Nitrogen and carbon are also capable of forming compounds with the basis metal, thereby improving the strength properties of the cage (i.e., strength against the force of deformation and fatigue strength).

These effects of the surface treatments (A) and (B) are described on the basis of test data. The sample bearings used in the test were FP 501724 and FP 501729 (both were thrust needle bearings with outer diameter of 37 mm and inner diameter of 17 mm, assembled to a width of 7.0 mm; the cages (to be tested) were made by pressing an SPCC steel sheet to the same shape as shown in FIGS. 21A and 21B, with outer diameter of 34 mm, inner diameter of 17 mm and max. height 2.15 mm); the rolling elements (needles) and raceway rings were both made of SUJ 2 which was treated to have a surface nitrogen content of 0.3 wt % and a surface roughness of 0.03 Ra.

Figure 7:
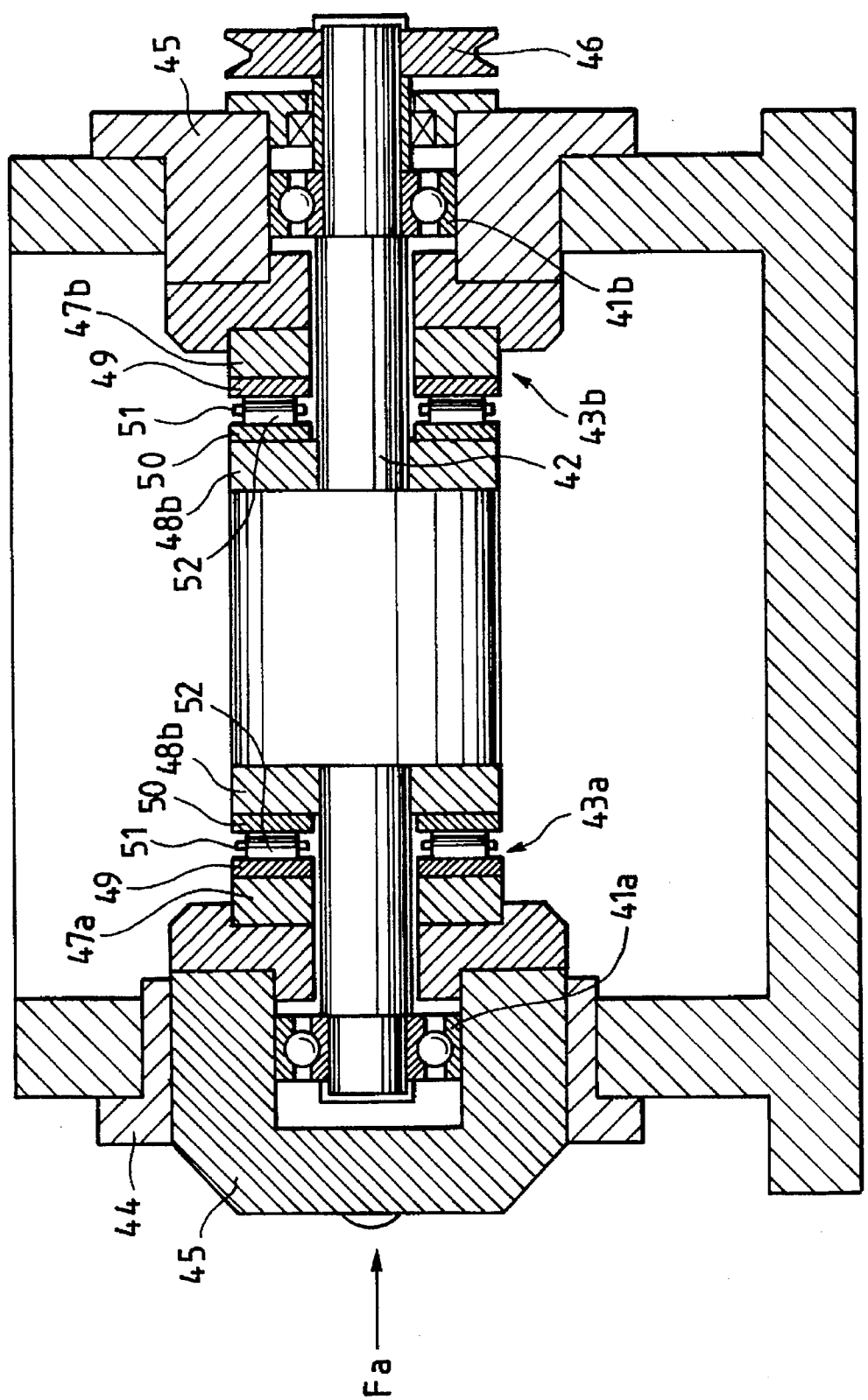
FIG. 7 is a schematic representation of a tester that was used to evaluate the life of bearing cages that were subjected to surface treatments as specified according to the second embodiment of the present invention.

FIG. 7 shows schematically the construction of the life tester employed in the test. The tester has a shaft 42 rotatably supported on a pair of bearings 41a and 41b. Two test bearings 43a and 43b are fitted to the shaft 42 and a thrust load Fa is applied to the test bearings 43a and 43b via a housing 45 supported on a guide 44 so that a pulley 46 is driven to rotate by a motor and a belt which are not shown in FIG. 7.

The shaft 42 is also fitted with a race fixing portion 47a and a race rotating portion 48a for mounting the test bearing 43a, and with a race fixing portion 47b and a race rotating portion 48b for mounting the test bearing 43b; race rotating portions 48a and 48b rotate together with the shaft 42 whereas race fixing portions 47a and 47b are so adapted that they do not rotate. The test bearing 43a has a first raceway ring 49 and a second raceway ring 50 which engage the race fixing portion 47a and the race rotating portion 48a, respectively; the test bearing 43b has a first raceway ring 49 and a second raceway ring 50 which engage the race fixing portion 47b and the race rotating portion 48b, respectively. If the shaft 42 rotates, the second raceway rings 50 of the test bearings 43a and 43b are driven to rotate together with the race rotating portions 48a and 48b under the action of needles 52 which are rotatably held within a cage 51. On the other hand, the first raceway rings 49 of the test bearings 43a and 43b are kept stationary (non-rotating) by the race fixing portions 47a and 47b, respectively.

The other test conditions were as follows: rotating speed, 5,000 rpm; thrust load, 500 kgf; lubricant, 5 g of PAG oil (containing 3% $H_2O$). Before the test bearings 43a and 43b were set in the tester, the raceway rings engaging the race fixing portions were removed and the PAG oil was injected into the pockets of the cage as it was dripped from a syringe.

The cages under test (made of SPCC steel sheet) were carbonitrided by exposure to an atmosphere containing an endothermic gas+an enrich gas+ammonia gas for 0.5 h and, thereafter, they were tempered at 200° C. for 2 h. The carbonitriding treatment may be replaced by carburization. Gas soft nitriding was also conducted by performing nitriding with ammonia gas at 500° to 600° C. for 1 h, which was followed by temper at 200° C. for 2 h.

Sulfonitriding was conducted by a reducing salt bath method using a cyanate bath supplied with sulfur compounds such as sodium sulfate and sodium sulfite at 560° C. for 1 h. To form a polytetrafluoroethylene (PTFE) coat, a PTFE solution in an organic solvent containing polyamide-imide as a binder was spray coated and the applied layer was heat treated at 200° C. for 1 h. Particularly, in the above examples, a manganese phosphate coat was formed on the surfaces of the cages in order to enhance the adhesion between the PTFE coat and the substrate surface.

The structure produced by gas soft nitriding is formed of the nitride (chiefly $Fe_3N$) surface layer and the nitrogen inner diffusion layer. The concentration of surface nitrogen depends on the temperature of the treatment; although a nitride layer having nitrogen dissolved therein can be formed even at 500° C. or below but in order to insure wear resistance, it is particularly preferred to perform gas soft nitriding at a temperature ranging from 500° C. (more preferably from 545° C.) to 600° C. The depths of hardening of the nitride ($Fe_3N$) surface layer and the nitrogen inner diffusion layer depend on the time of the treatment and contribute to the improvement in wear resistance. Additionally, combining carburization or carbonitriding as the primary treatment with gas soft nitriding as the secondary treatment makes it possible to have carbon dissolved in the $Fe_4N$ diffusion layer in which carbon is hardly soluble, and this helps improve hardness and anti-seizure properties.

The depth of the hardness layer to be formed by sulfonitriding also depends on the time of the treatment. A compound layer a few microns thick suffices to provide improved wear resistance and it is desirable to perform the treatment at a temperature in the range from 500° to 600° C. Additionally, carburization or carbonitriding may be combined as the primary treatment with sulfonitriding as the secondary treatment to form a compound of iron, sulfur and nitrogen with carbon dissolved in the surface and this is desirable for assuring wear resistance to anti-seizure properties.

Figure 8:
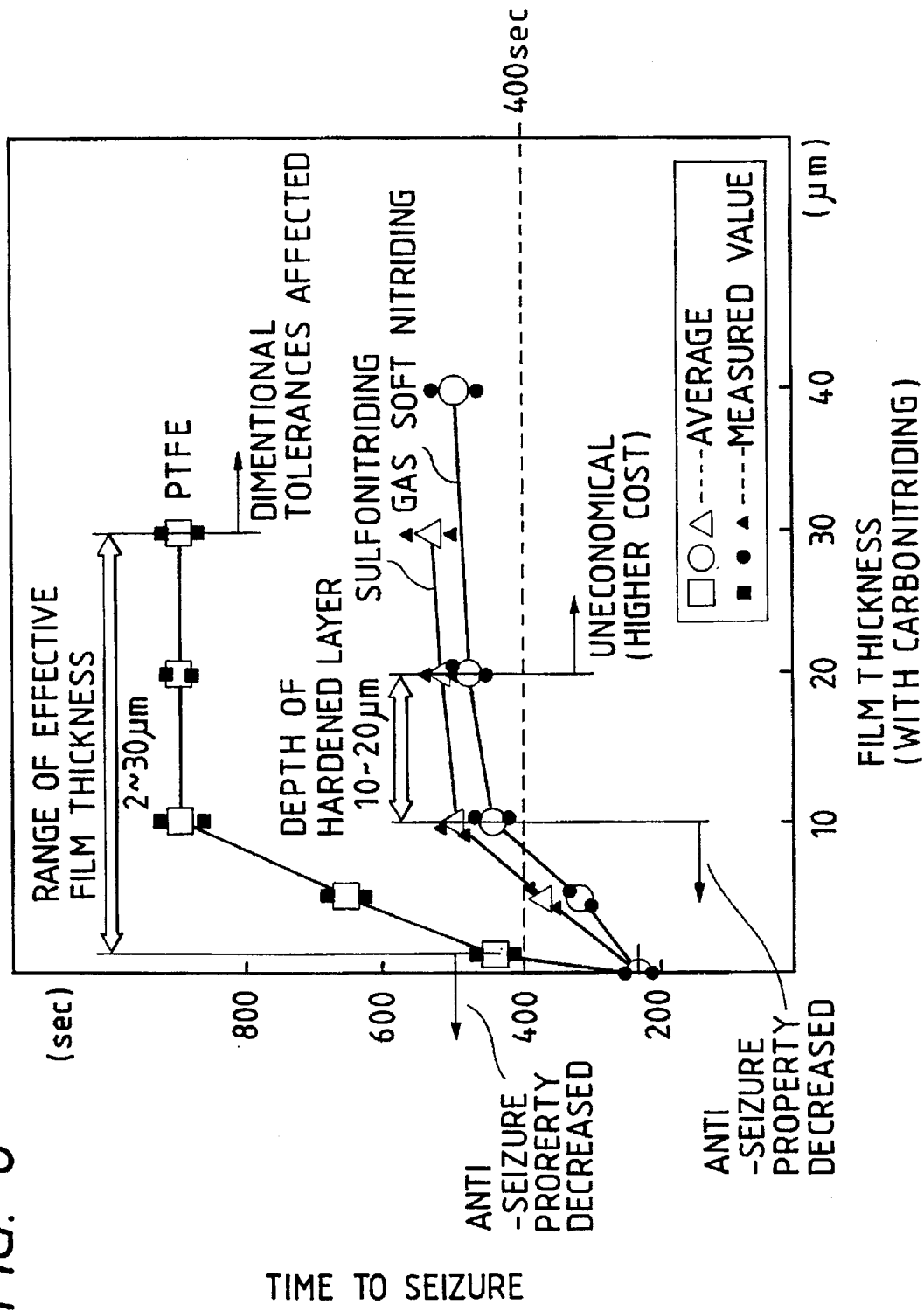
FIG. 8 is a graph showing the results of a life test that was conducted on cage samples that were subjected to various surface treatments under varying film thicknesses.
Figure 9:
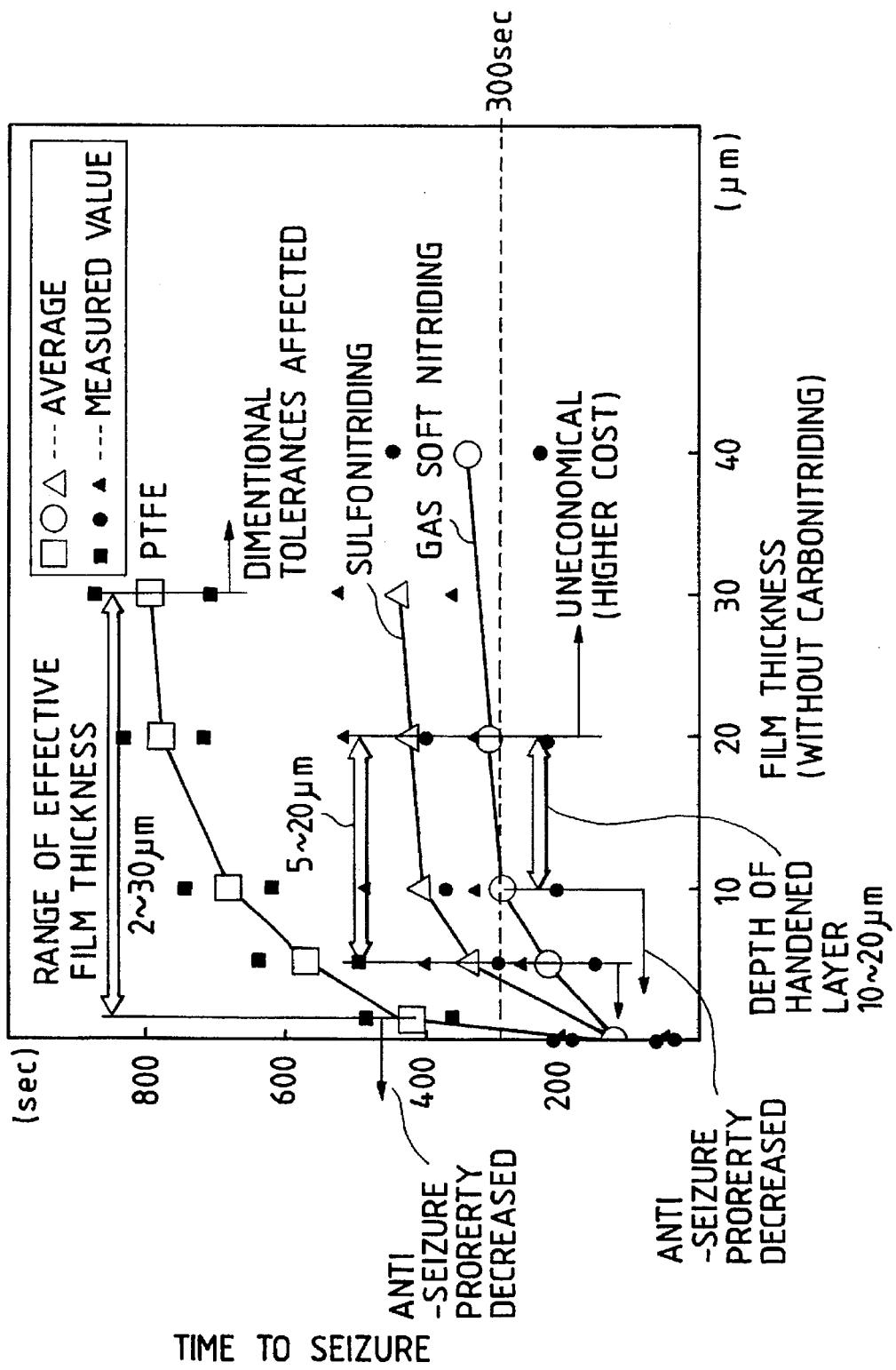
FIG. 9 is a graph showing the results of a life test that was conducted on cage samples that were not subjected to a carbonitriding treatment before they were subjected to the various surface treatments referred to in FIG. 8.

The various surface treatments described above were applied to cage samples for varying thicknesses of coating or depths of hardened layer and bearings having such treated cages were tested for service life with a tester of the type shown in FIG. 7. The results are shown in FIGS. 8 and 9. FIG. 8 shows the relationship between the thickness of coating and the time to seizure for the three cases of cage treatment: carbonitriding was followed by gas soft nitriding, sulfonitriding or coating with polytetrafluoroethylene (PTFE: primed to form a manganese phosphate coat in a thickness of 4 to 5 µm); FIG. 9 shows the same relationship for the same cases as in FIG. 8 except that carbonitriding was not performed.

Looking at FIGS. 8 and 9, one can see that irrespective of whether carbonitriding was preliminarily performed or not, application of either treatment, i.e., gas soft nitriding, sulfonitriding or PTFE coating, extended the time to seizure over the time to seizure for the untreated cages indicated by the dashed lines; it was therefore clear that those treatments were effective in extending the service life of the cage.

FIGS. 8 and 9 also show that irrespective of whether carbonitriding was preliminarily performed or not, the cages that were treated by either gas soft nitriding or sulfonitriding to be given hardened layers in depths or coating thicknesses of at least 10 µm (the depth here is defined as the value that gives a hardness of at least 320 to 350 Hv, desirably at least 450 to 500 Hv) had better wear resistance and allowed longer times to seizure than the untreated cages; it was therefore found that the depth of the hardened layer to be formed by gas soft nitriding or sulfonitriding is preferably 10 µm or more. It was also found that forming hardened layers deeper than 20 µm simply took time for the necessary treatment and did not contribute much to extend the time to seizure, thus failing to achieve the intended extension of the service life. Therefore, considering economy, it was verified that the depth of hardened layers to be formed by gas soft nitriding or sulfonitriding or by combining either of these with carbonitriding is preferably within the range from 10 to 20 µm.

As for the application of PTFE coating, it was found that irrespective of whether carbonitriding was preliminarily performed or not, the time to seizure was significantly extended compared to the case where gas soft nitriding or sulfonitriding was performed and a PTFE coat about 2 μm thick exhibited an effect comparable to the saturated value of time to seizure for the gas soft nitriding or sulfonitriding. It was also found that the effectiveness in life extension was saturated when the thickness of PTFE coat exceeded 10 μm (in the case where preliminary carbonitriding was conducted) or 20 μm (where carbonitriding was not conducted). Additionally, it was verified that when the thickness of PTFE coat exceeded 30 μm, the dimensional tolerances of cages were affected to cause either too great or too small clearances from rolling elements. Therefore, considering these data, it was verified that the thickness of PTFE coating is desirably in the range from 2 to 30 μm, preferably 10 to 30 μm.

Comparing FIGS. 8 and 9, one can also see that the cages that were preliminarily subjected to a carbonitriding treatment (FIG. 8) had longer lives irrespective of whether they were subsequently treated by gas soft nitriding, sulfonitriding or coating with PTFE. The life extending effect of the carbonitriding treatment will now be described with reference to FIG. 10, with gas soft nitriding being taken as an example of the subsequent treatment.

Figure 10:
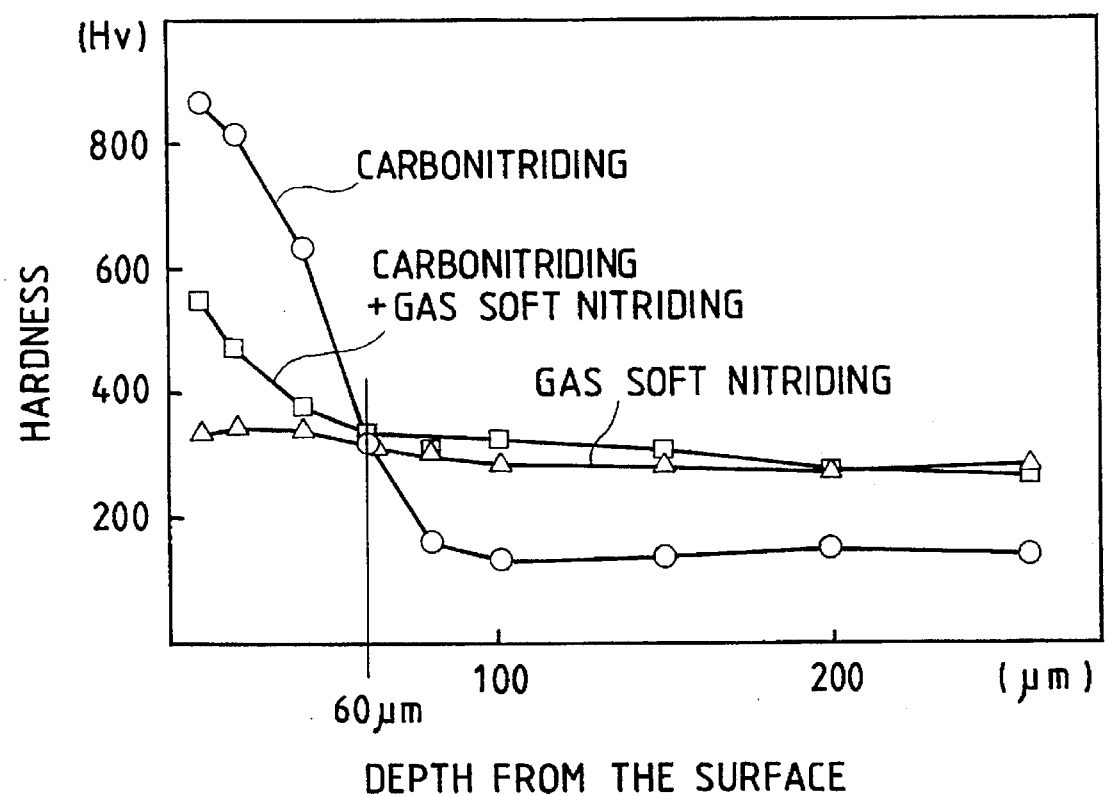
FIG. 10 is a graph showing the results of measurements on the hardness of SPCC steel sheets (0.5 mm thick) subjected to various surface treatments as a function of depth from the surface.

FIG. 10 shows the results of measurement of the relationship between depth from the surface and the hardness (Hv) for three cases of SPCC steel sheets (thickness of 0.5 mm) subjected to surface treatments such as carbonitriding, gas soft nitriding, and preliminary carbonitriding followed by gas soft nitriding.

As shown in FIG. 10, the surface layer of the sample that was given only a carbonitriding treatment had a hardness of at least 800 Hv; however, at a depth of 80 μm, the hardness dropped below 200 Hv (the hardness of the substrate SPCC) and was insufficient to bear fully the stress being transmitted from the surface. In the sample that was given only a gas soft nitriding treatment, the hardness of its interior was higher than that of the substrate but its surface hardness dropped below 400 Hv, indicating that the sample was less wear resistant than the other samples which were given only a carbonitriding treatment and the combination of carbonitriding and gas soft nitriding treatments.

The sample given the two treatments in combination had a highly wear resistant surface that featured a surface hardness of 580 Hv and interior hardness values greater than 300 Hv. This shows the following: the surface layer is hardened by carbonitriding; upon subsequent gas soft nitriding, nitrogen diffuses deep from the surface inward but a hardness drop occurs when temper is done; namely, the increase in hardness due to the ingress and diffusion of nitrogen as the result of nitriding of the surface layer combines with the drop in hardness due to subsequent temper, thereby insuring that the hardness of the surface layer is lower than when only the carbonitriding treatment is effected but higher than when only the gas soft nitriding treatment is effected, whereas the hardness of the inner part is comparable to the value achieved by the gas soft nitriding treatment. Additionally, the fatigue strength of the cage is sufficiently increased to prevent the occurrence of damage to the roller nesting columns (partitions). Further, the hardness interior renders the cage less likely to deform. As is apparent from FIG. 10, the data for the case where carbonitriding was followed by gas soft nitriding were less variable than when carbonitriding alone was conducted. This would be because any wear or damage that occurs to the surface layer is stopped by the underlying carbonitrided layer, thereby assuring the overall reliability of the cage.

As described above, according to the second embodiment of the present invention, the cage of a thrust needle bearing is at least subjected to the specified treatment for incorporating nitrogen, or it is coated with a solid lubricant after being primed by the specified procedure to insure adhesion to the substrate, such that improved wear resistance and lubricating conditions are provided to retard the occurrence of seizure, whereby the case is rendered to have a sufficient long life so that it performs satisfactorily even in environments provided with CFC substrates in combination with working oils that generate water during lubrication. Further, the present invention is applicable not only to thrust needle bearings but also to various other types of bearings as long as the cage is subjected to the surface treatments described above. Moreover, the other members of bearing such as rolling elements and raceway rings may also be subjected to those surface treatment.

Third Embodiment

Figure 11A:
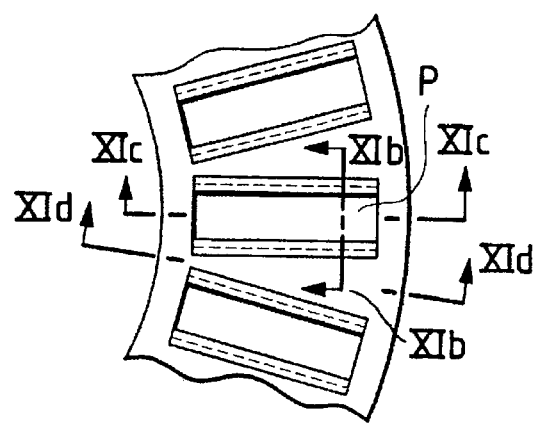
FIGS. 11A to 11D show the structure of a first modification of the cage of a thrust needle-shaped roller bearing according to the third embodiment of the present invention.
Figure 11B:
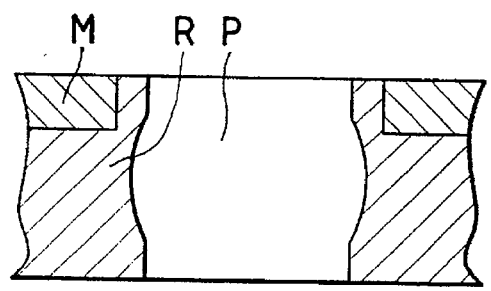
Figure 11C:
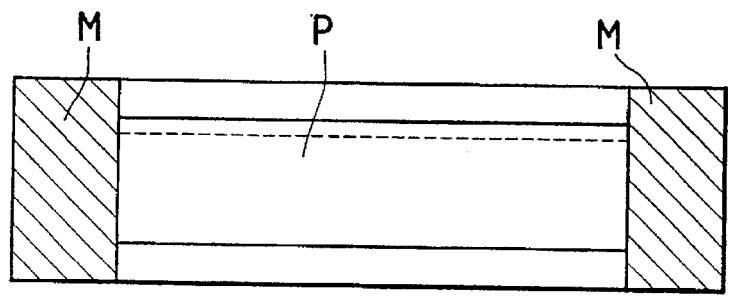

FIGS. 11A to 20D show the structures of various modifications of the cage for use in a thrust needle-shaped roller Rearing according to the third embodiment of the present invention. FIG. 11A is a plan view of a first modification of the cage. FIG. 11B is a section taken along XIb—XIb of FIG. 11A. FIG. 11C is a section taken along XIc—XIc of FIG. 11A. FIG. 11D is a section taken along XId—XId of FIG. 11A. Similarly, FIGS. 12A to 20D are plan views and sections of the respective modifications of the cage.

The cages shown in FIGS. 11A to 19D are made of a metallic core or ring and a resin part. Metals that can be used are in no way limited but a cold rolling steel sheet (SPCC) may be mentioned as an example.

Preferred resin materials are those which are excellent in sliding property, resistance to heat, chemicals and oils, and strength; specific examples of preferred resins include nylon 66 resin, nylon 46 resin and polyphenylene sulfide resin (PPS resin), which may be reinforced with short filaments of fibers such as glass and carbon fibers. Nylon 66 resin may be available under various trademarks such as "ZYTEL" (Du Pont), "UBE NYLON" (Ube Industries, Ltd.) and "ULTRAMID-A" (BASF Engineering Plastics Co.); nylon 46 resin is available under the trademarks "TEIJIN 46 NYLON" (Teijin Ltd.) and "STANYL" (Japan Synthetic Rubber Co., Ltd.); and PPS resin is available under the trademark "FORTRON KPS" (Kureha Chemical Industry Co., Ltd.)

The cages shown in FIGS. 11A to 19D can be produced by either one of the following methods: i) provide a mold of such a shape that when a prefabricated metallic core or ring is set in the mold, a space is formed in areas that correspond to part or all of the guides of rolling elements and then fill the space with a resin by injection molding; ii) fabricate a metallic core or ring as a separate member from a resin part and assemble them such as by using the snap fitting property of the resin.

Figure 11D:
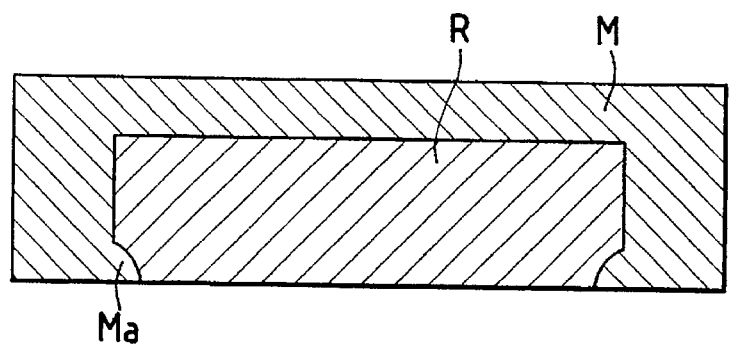

The cage shown in FIGS. 11A to 11D is composed basically of a resin part R, except that the top surface of the portion between adjacent pockets P (i.e., the partition or column) which is other than the neighborhood of each pocket P, the area between an end face of pocket P and the inner circumferential portion of the cage and the area between an end face of pocket P and the outer circumferential portion of the cage are composed of a metal part M. Thus, resin part R is exposed on each of the lateral surfaces of pocket P which contact the lateral surfaces of a roller element, whereas metal part M is exposed on each of the end faces of pocket P which contact the end faces of a roller element. As shown in FIG. 11D, both the inner surface of the radially inward portion of metal part M and the inner surface of its radially outward portion have a projection Ma formed in order to prevent the dislodging of the resin part R.

Figure 12A:
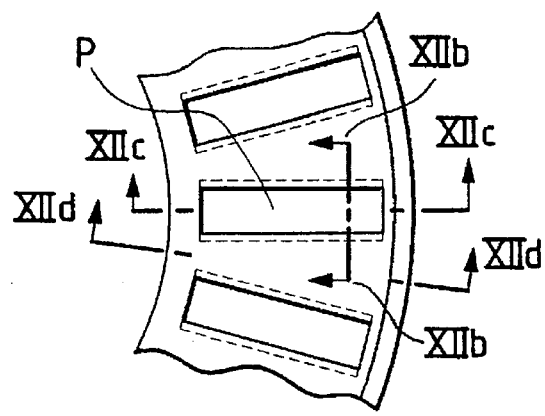
FIGS. 12A to 12D show the structure of a second modification of the cage of a thrust needle-shaped roller bearing according to the third embodiment of the present invention.
Figure 12B:
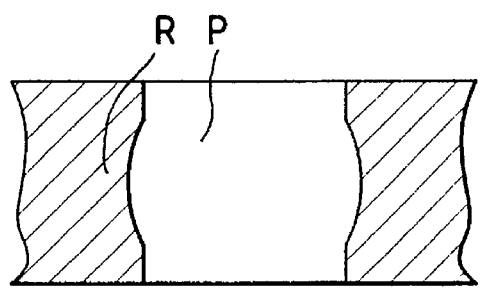
Figure 12C:
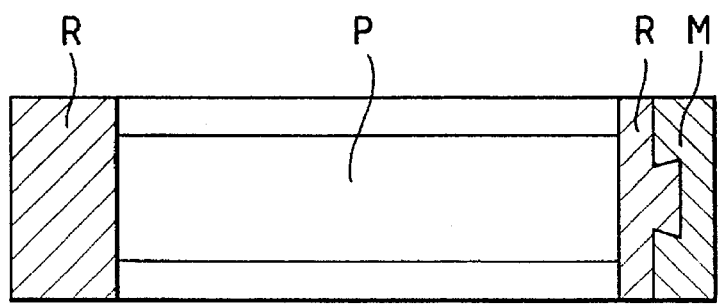
Figure 12D:
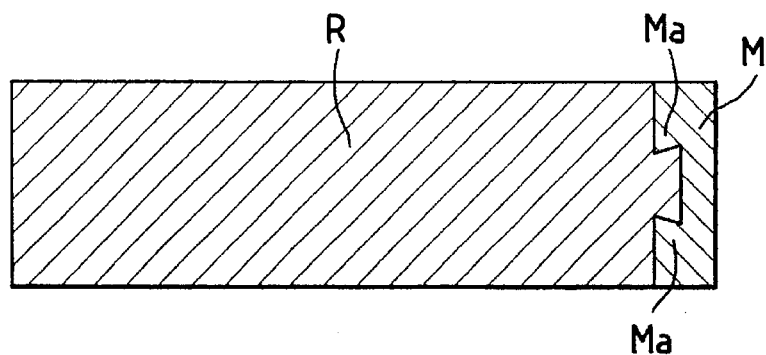

The cage shown in FIGS. 12A to 12D is composed basically of a resin part R, except that the outer circumferential portion radially outward of pocket P is composed of a metal part M. Thus, resin part R is exposed on all surfaces of the pocket P that contact a roller. As shown in FIG. 12D, a projection Ma for preventing the dislodging of resin part R is formed along the entire circumference of the cage in both the upper and lower portions of the inner surface of metal part M.

Figure 13A:
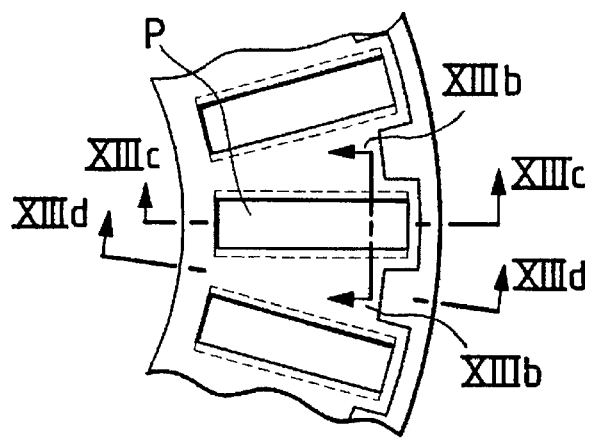
FIGS. 13A to 13D show the structure of a third modification of the cage of a thrust needle-shaped roller bearing according to the third embodiment of the present invention.
Figure 13B:
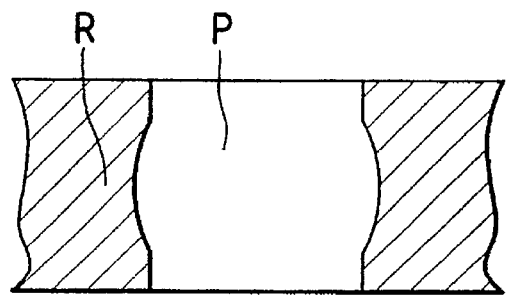
Figure 13C:
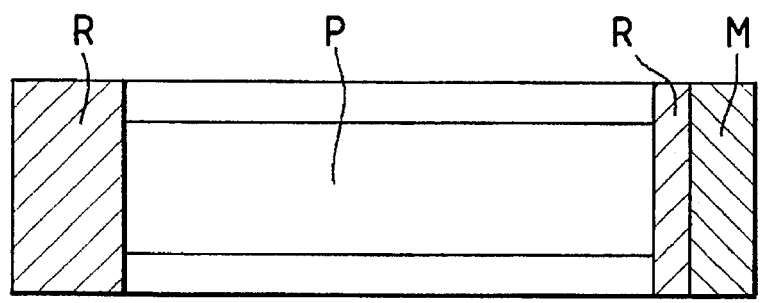
Figure 13D:
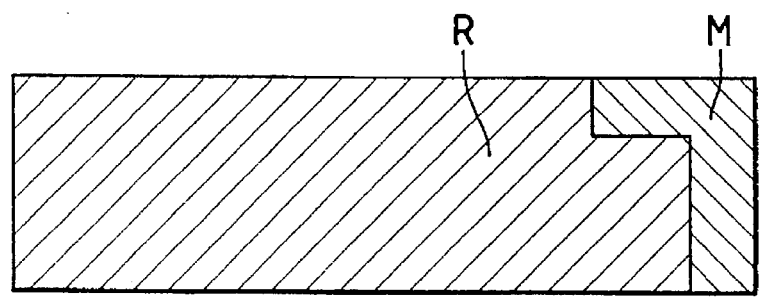
Figure 14A:
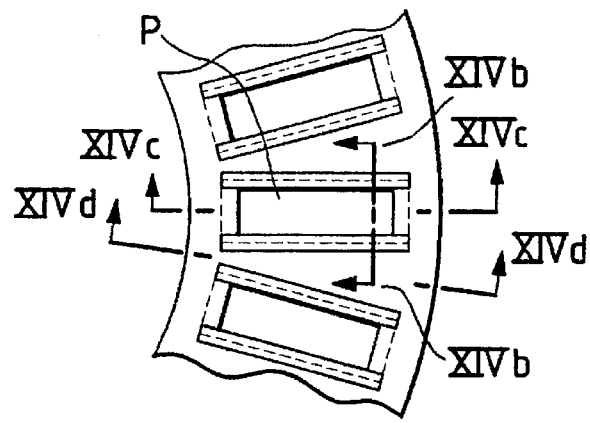
FIGS. 14A to 14D show the structure of a fourth modification of the cage of a thrust needle-shaped roller bearing according to the third embodiment of the present invention.
Figure 14B:
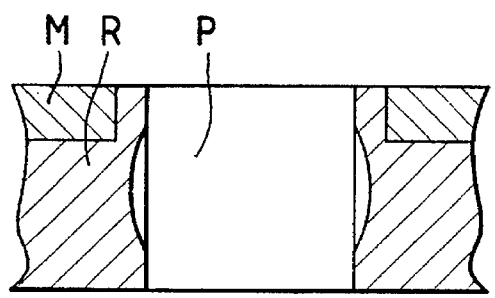
Figure 14C:
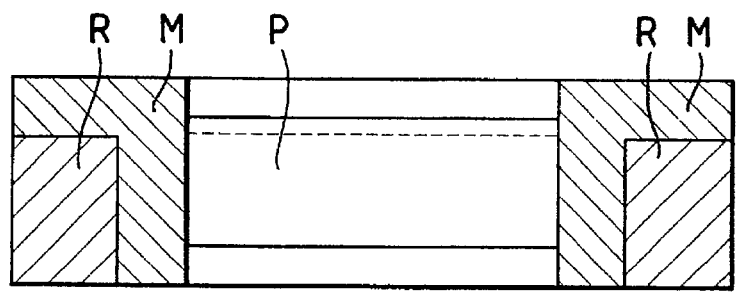
Figure 14D:
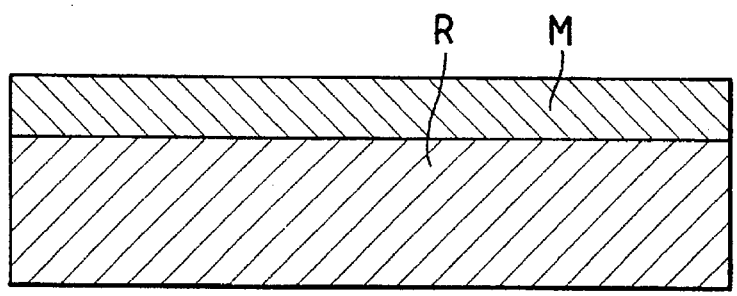

The cage shown in FIGS. 13A to 13D is composed basically of a resin part R, except that its outer circumferential portion is composed of a metal part M. Thus, the resin part R is exposed on all surfaces of the pocket P that contact a roller. As shown in FIGS. 13A and 13D, the top surface of the metal part M projects radially inward between adjacent pockets P.

The cage shown in FIGS. 14A to 14D is composed basically of a resin part R, except that the top surface of the portion of each partition which is other than the neighborhood of each pocket P, the area extending from an end face of each pocket P to the top surface of the inner circumferential side of the cage, and the area extending from the other end face of each pocket P to the top surface of the outer circumferential side of the cage are composed of a metal part M. Thus, the resin part R is exposed on each of the lateral surfaces of pocket P which contact the lateral surfaces of a roller element, whereas metal part M is exposed on each of the end faces of pocket P which contact the end faces of a roller element.

Figure 15A:
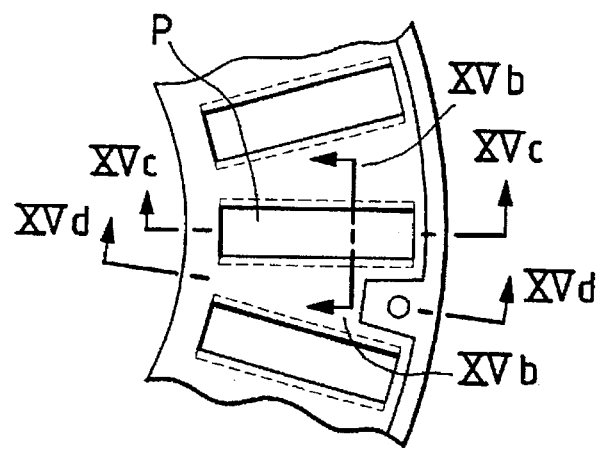
FIGS. 15A to 15D show the structure of a fifth modification of the cage of a thrust needle-shaped roller bearing according to the third embodiment of the present invention.
Figure 15B:
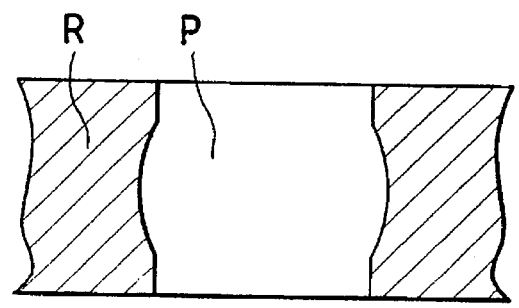
Figure 15C:
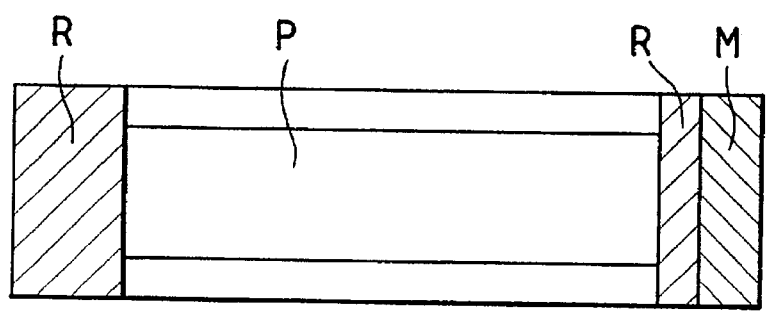
Figure 15D:
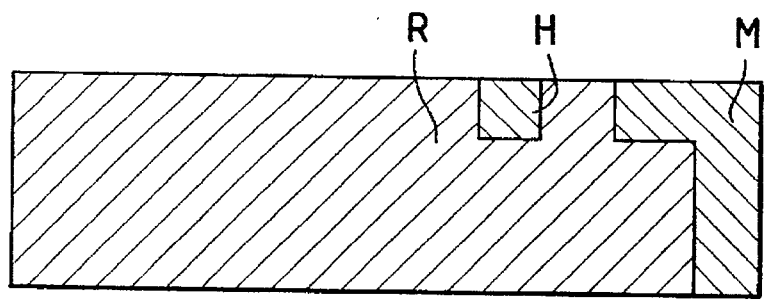
Figure 16A:
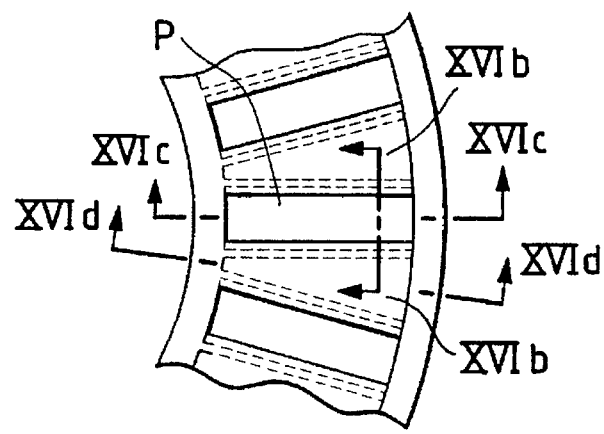
FIGS. 16A to 16D show the structure of a sixth modification of the cage of a thrust needle-shaped roller bearing according to the third embodiment of the present invention.
Figure 16B:
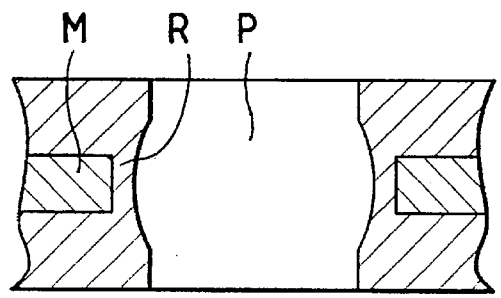
Figure 16C:
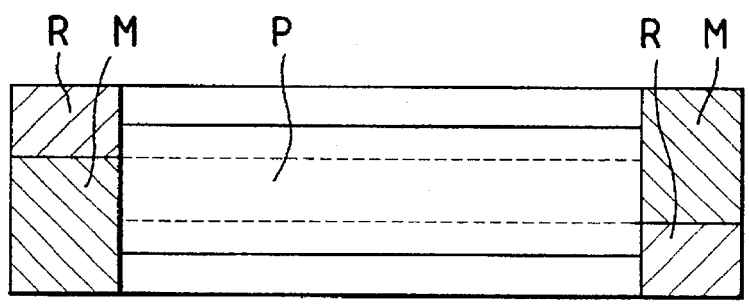
Figure 16D:
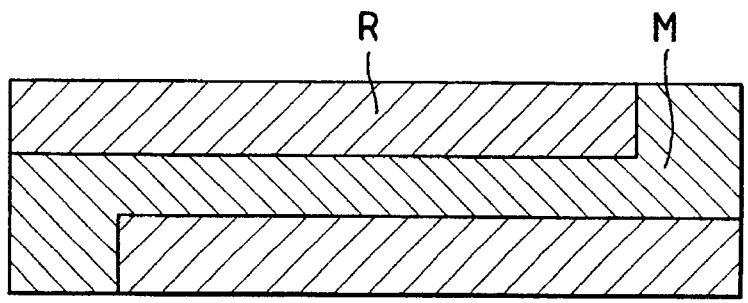
Figure 17A:
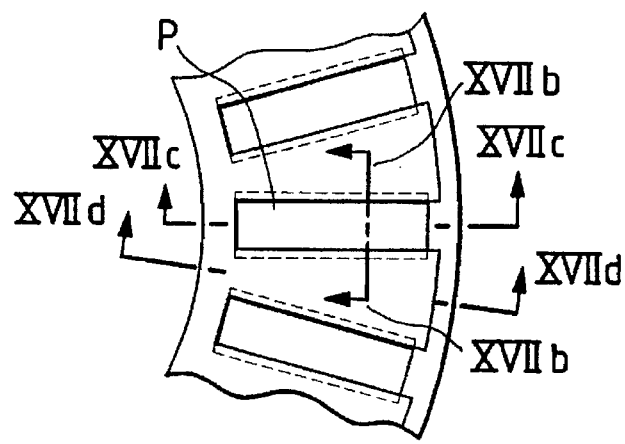
FIGS. 17A to 17D show the structure of a seventh modification of the cage of a thrust needle-shaped roller bearing according to the third embodiment of the present invention.
Figure 17B:
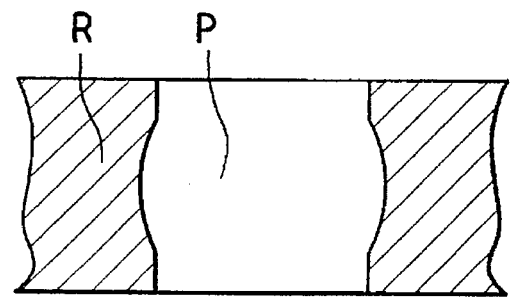
Figure 17C:
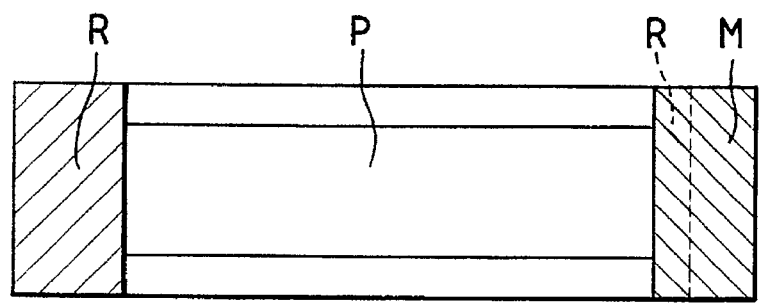
Figure 17D:
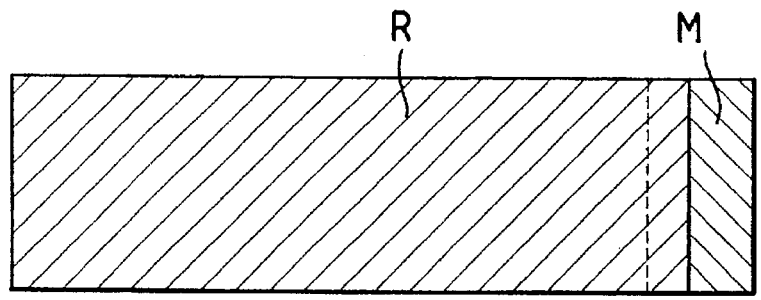
Figure 18A:
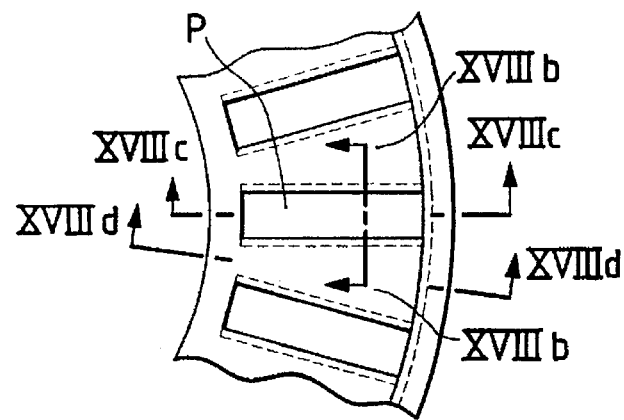
FIGS. 18A to 18D show the structure of an eighth modification of the cage of a thrust needle-shaped roller bearing according to the third embodiment of the present invention.
Figure 18B:
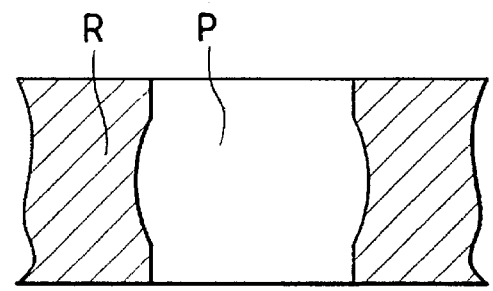
Figure 18C:
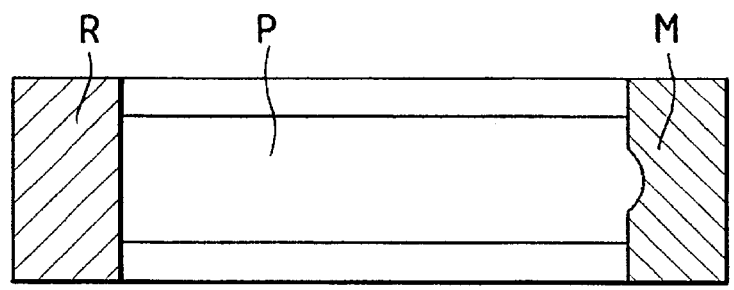
Figure 18D:
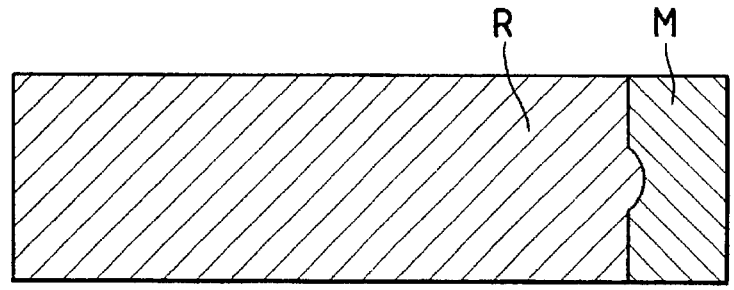
Figure 19A:
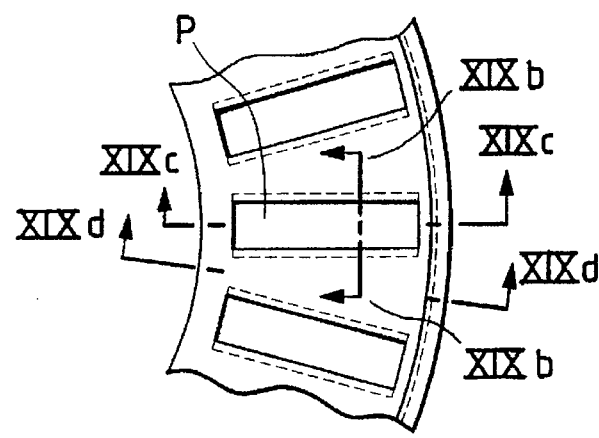
FIGS. 19A to 19D show the structure of a ninth modification of the cage of a thrust needle-shaped roller bearing according to the third embodiment of the present invention.
Figure 19B:
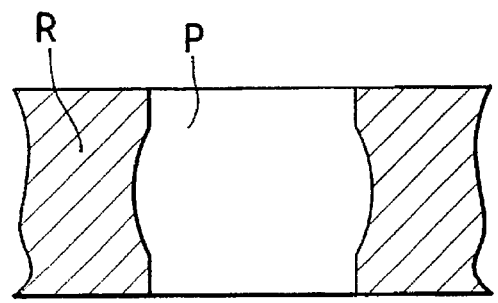
Figure 19C:
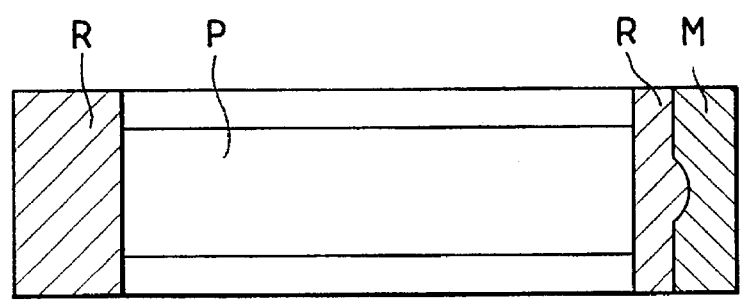
Figure 19D:
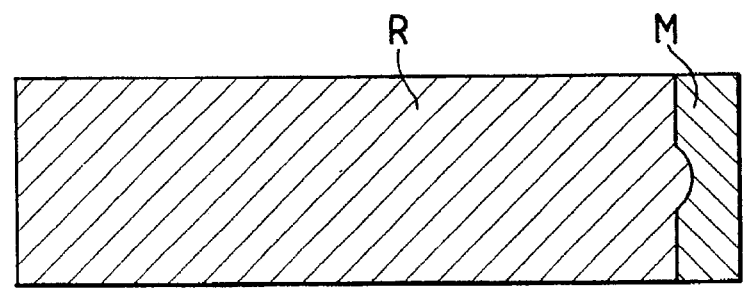

The cage shown in FIGS. 15A to 15D is composed basically of a resin part R, except that the outer circumferential portion is composed of a metal part M. Thus, the resin part R is exposed on all surfaces of the pocket P that contact a roller. As shown in FIGS. 15A and 15D, the top surface of metal part M projects radially inward between adjacent pockets P and a hole H is formed in this projecting part such that it is filled with a resin to insure that the metal part M is securely bound to the resin part R.

The cage shown in FIGS. 16A to 16D is composed basically of a resin part R, except that the portion of the middle layer of each partition which is other than the neighborhood of pocket P, the middle- and bottom-layer portions between said portion of the middle layer and the inner circumference of the cage, and the middle- and top-layer portions between said portion of the middle layer and the outer circumference of the cage are composed of a metal part M. Thus, the resin part R is exposed on each of the lateral surfaces of the pocket P that contact the lateral surfaces of a roller whereas the metal part M is exposed on part of each of the end faces of the pocket P that contact the end faces of a roller.

The cage shown in FIGS. 17A to 17D is composed basically of a resin part R, except that the area of its outer circumference that is outward of each pocket P is composed of a metal part M. Thus, the resin part P is exposed on each of the lateral surfaces of the pocket P that contact the lateral surfaces of a roller, whereas the metal part M is exposed on the outer end face of the pocket P that contacts an end face of a roller. The metal part M is made thicker in the area that opposes the outer end face of the pocket P than in the other areas so as to insure that the pocket P does not come out of phase with respect to the metal part M.

The cage shown in FIGS. 18A to 18D is composed basically of a resin part R, except that its outer circumferential portion radially outward of each pocket P is composed of a metal part M. Thus, the resin part R is exposed on each of the lateral surfaces of the pocket P that contact the lateral surfaces of a roller, whereas the metal part M is exposed on the outer end face of the pocket P which contacts an end face of a roller. The middle-layer portion of the metal part M concaves to insure that the resin part R does not be dislodged from the metal part M.

The cage shown in FIGS. 19A to 19D is composed basically of a resin part R, except that its outer circumferential portion radially outward of each pocket P is composed of a metal part M. Thus, the resin part R is exposed on all surfaces of the pocket P that contact a roller. Further, the middle-layer portion of the area of the metal part M which corresponds to the outer end face of the pocket P concaves to insure that the resin part R does not be dislodged from the metal part M.

Figure 20A:
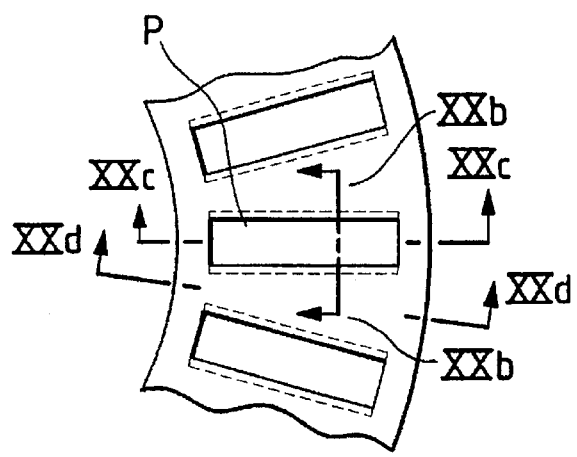
FIGS. 20A to 20D show the structure of a tenth modification of the cage of a thrust needle-shaped roller bearing according to the third embodiment of the present invention.
Figure 20B:
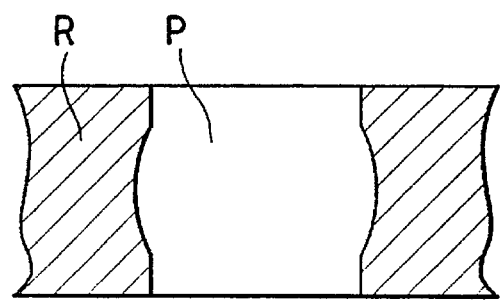
Figure 20C:
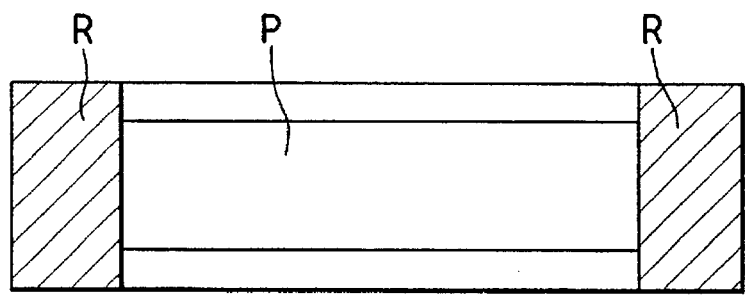
Figure 20D:
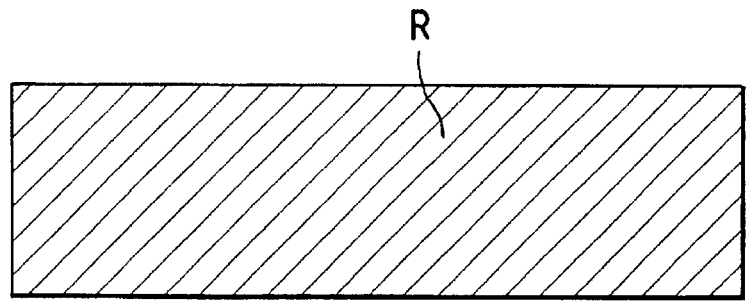

The cage shown in FIGS. 20 to 20D is wholly composed of a resin part R. This all-resin cage can be produced by injection molding. FIGS. 21A and 21B show a conventional cage which is made from a cold rolling steel sheet (SPCC). FIG. 21A is a plan view of the cage, and FIG. 21B is a section taken along XXIb—XXIb of FIG. 21A.

Cages of the structures shown in FIGS. 11A to 14D and 20A to 20D were fabricated with the resin part R being made of various kinds of resins. The thus constructed cages were subjected to a life test with a trust needle-type tester manufactured by NSK Ltd. The test results were as shown in Table 4. The test conditions were as follows: Pmax=2,000 MPa; N=4,900 cpm; atmosphere=HFC-134a (alternate fluorocarbon, 2 atm.); and lubricant=PAG. Bearings subjected to tests had the following dimensions: outer diameter of 37 mm; inner diameter of 17 mm, width of 14 mm; roller diameter of 2.5 mm; and roller length of 5.6 mm. An evaluation of service life was conducted by the criteria of regarding less than $10 \times 10^6$ revolutions as not durable (X), $10 \times 10^6$ to less than $50 \times 10^6$ revolutions as durable (o), and $50 \times 10^6$ revolutions and more as very durable (⊚)

TABLE 4

| Specimen No. | Resin composition | | Cage | Service life |
|---|---|---|---|---|
| | Resin and its content, wt % | Glass fiber, wt % | | |
| 1 | nylon 66 | 80 | 20 | FIGS. 11A to 11D | o |
| 2 | nylon 46 | 80 | 20 | FIGS. 11A to 11D | o |
| 3 | PPS | 80 | 20 | FIGS. 11A to 11D | ⊚ |
| 4 | nylon 66 | 70 | 30 | FIGS. 12A to 12D | o |
| 5 | nylon 46 | 70 | 30 | FIGS. 12A to 12D | ⊚ |
| 6 | PPS | 70 | 30 | FIGS. 12A to 12D | o |
| 7 | PPS | 80 | 20 | FIGS. 13A to 13D | o |
| 8 | PPS | 80 | 20 | FIGS. 14A to 14D | O |
| 9 | PPS | 80 | 20 | FIGS. 20A to 20D | o |
| 10 | nylon 46 | 70 | 30 | FIGS. 20A to 20D | o |

TABLE 4-continued

| | Resin composition | | | |
|---|---|---|---|---|
| Specimen No. | Resin and its content, wt % | Glass fiber, wt % | Cage | Service life |
| 11 | nylon 66 | 80 | 20 | FIGS. 20A to 20D | o |
| 12 | — | — | FIGS. 21A and 21B | x |

In Specimen No. 1, the resin part R of the cage (FIGS. 11A to 11D) was made of nylon 66 resin and glass fibers at a weight ratio of 80:20 and the bearing employing this cage could secure a service life of $10 \times 10^6$ to less than $50 \times 10^6$ revolutions, demonstrating its satisfactory durability. In Specimen No. 2, the resin part R of the cage (FIGS. 11A to 11D) was made of nylon 46 resin and glass fibers at a weight ratio of 80:20 and the bearing employing this cage could secure a service life of $10 \times 10^6$ to less than $50 \times 10^6$ revolutions, also demonstrating its satisfactory durability. In Specimen No. 3, the resin part R of the cage (FIGS. 11A to 11D) was made of PPS (polyphenylene sulfide) resin and glass fibers at a weight ratio of 80:20 and the bearing employing this cage could secure a service life of $50 \times 10^6$ and more revolutions, thus demonstrating its excellent durability.

In Specimen No. 4, the resin part R of the cage (FIGS. 12A to 12D) was made of nylon 66 resin and glass fibers at a weight ratio of 70:30 and the bearing employing this cage could secure a service life of $10 \times 10^6$ to less than $50 \times 10^6$ revolutions, demonstrating its satisfactory durability. In Specimen No. 5, the resin part R of cage (FIGS. 12A to 12D) was made of nylon 46 and glass fibers at a weight ratio of 70:30 and the bearing employing this cage could secure a service life of $50 \times 10^6$ and more revolutions, thus demonstrating its excellent durability. In Specimen No. 6, the resin part R of the cage (FIGS. 12A to 12D) was made of PPS (polyphenylene sulfide) resin and glass fibers at a weight ratio of 70:30 and the bearing employing this cage could secure a service life of $10 \times 10^6$ to less than $50 \times 10^6$ revolutions, demonstrating its satisfactory durability.

In Specimen No. 7, the resin part R of the cage (FIGS. 13A to 13D) was made of PPS resin and glass fibers at a weight ratio of 80:20 and the bearing employing this cage could secure a service life of $10 \times 10^6$ to less than $50 \times 10^6$ revolutions, demonstrating its satisfactory durability. In Specimen No. 8, the resin part R of the cage (FIGS. 14A to 14D) was made of PPS resin and glass fibers at a weight ratio of 80:20 and the bearing employing this cage could secure a service life of $50 \times 10^6$ and more revolutions, thus demonstrating its excellent durability.

The resin part R of the cage shown in FIGS. 20A and 20D was made of PPS resin and glass fibers at a weight ratio of 80:20 (Specimen No. 9), or nylon 46 resin and glass fibers at a weight ratio of 70:30 (Specimen No. 10), or nylon 66 resin and glass fibers at a weight ratio of 80:20 (Specimen No. 11); in either case, the bearing employing the cage could secure a service life of $10 \times 10^6$ to less than $50 \times 10^6$ revolutions, demonstrating its satisfactory durability. However, in Specimen No. 12 which used a metallic cage of the type shown in FIGS. 21A and 21B, the bearing could secure a service life of only less than $10 \times 10^6$ revolutions and had no practical durability.

The service life of bearings is considered in respect of the sliding between the cage and rolling elements. If the lubricating conditions are not very favorable as in atmosphere of the alternate fluorocarbon used in the above tests, the lubricating oil film formed between the metallic cage and the rolling elements is insufficient to prevent direct contact between metal parts and rapid wear from occurring. One reason for the occurrence of direct contact between metal parts would be that metals have higher rigidity than resins so that a high stress produces in the area of contact between the cage and each rolling element.

On the other hand, if the parts of the cage that guide rolling elements are made of resin materials, the extremely high elastic moduli of resins compared to those of metals insure that the resins, if subjected to high stress, deform to distribute the applied stress. Without lubrication, the amount of wear that occurs as the result of friction between a metal and a resin tends to be smaller than in the case of contact between metals.

As regards the rigidity of the cage, metals are superior to resins. In the cases of FIGS. 11A to 19D, the rigidity of the cage is maintained effectively by the metal part M so that it can be prevented from undergoing creep deformation under the centrifugal force of the fast rotating rolling elements. In addition, the resin part R forming the areas of the cage that guide rolling elements insure that they exhibit neither abnormal wear nor seizure upon friction with the cage. Because of these features, the bearing can perform for an extended period of time even if it is used in an unfavorable lubricating condition as in an atmosphere filled with an alternate fluorocarbon.

If the bearing to be used in an unfavorable lubricating condition such as in the presence of an alternate fluorocarbon is intended for rotation at low speed and under small load, there is no possibility of creep deformation even if the rigidity of the bearing is not very great. In a case like this, the resin-made cage shown in FIGS. 20A and 20D which is easy to manufacture may be rendered to perform for an extended time by merely insuring that there is no abnormal wear or seizure of the rolling elements due to friction with the cage.

Modification of the Second Embodiment

By referring to FIGS. 8 and 9, it is confirmed that the PTFE (polytetrafluoroethylene) is the most effective in ensuring against seizure irrespective of whether a carbonitriding treatment is preliminarily performed or not. Next, there are described modifications of the second embodiment of the present invention that is characterized by an improved method of forming the PTFE coat. More specifically, in the aforementioned examples of the second embodiment of the present invention, PTFE (polytetrafluoroethylene) and other solid lubricants were applied by air spaying; in the modification to be described hereinafter, the solid lubricants are applied not by spraying but by coating from a liquid dispersion. The following is a detailed description of this modifications.

The cage is typically made from a cold rolling steel sheet (SPCC) and shaped as shown in FIGS. 21A and 21B. However, this is not the sole case of the present invention and the cage may be formed not by rolling but cutting various other steels and metals (preferably those which are corrosion resistant).

The following description is directed to the case of forming a solid lubricant coat from polytetrafluoroethylene (PTFE), which is the most effective in ensuring against seizure, with polyamideimide being used as a binder. However, as already mentioned, PTFE may be replaced by other solid lubricants including molybdenum disulfide ($MoS_2$) and tungsten disulfide ($WS_2$), one of which may be used in admixture with PTFE. The binder also is not limited to any particular type and polyamideimide, epoxies and other resins may be selected as appropriate. Whichever of these solid lubricants and binders may be used, the results are comparable to the test data that are set forth below.

The phosphate coat which serves as a prime coat for solid lubricants has surface asperities that increase the area of contact with the overlying solid lubricant and binder layer, whereby it combines with the binder so strongly as to enhance the adhesion between the solid lubricant and the substrate surface. An experiment with manganese phosphate coating revealed that in order to insure the above-described advantage of the phosphating treatment, the thickness of the phosphate coat is preferably in the range from 1 to 10 μm (see FIG. 22). In that experiment, manganese phosphate coats thinner than 1 μm were formed by adjusting the temperature and time for the treatment. For instance, a manganese phosphate coat 0.9 μm thick was formed by 10-min treatment with an aqueous solution of manganese phosphate that was set at a temperature of 60° to 70° C. On the other hand, manganese phosphate coats thicker than 10 μm were formed by adjusting the concentration of manganese phosphate in the treating solution. For instance, a coat 10 μm thick was formed with the manganese phosphate concentration increased to 1.2 times the value for a thickness of 4 μm, and a coat 40 μm thick was formed with the manganese phosphate concentration increased to 1.4 times the value for the thickness 4 μm.

Figure 22:
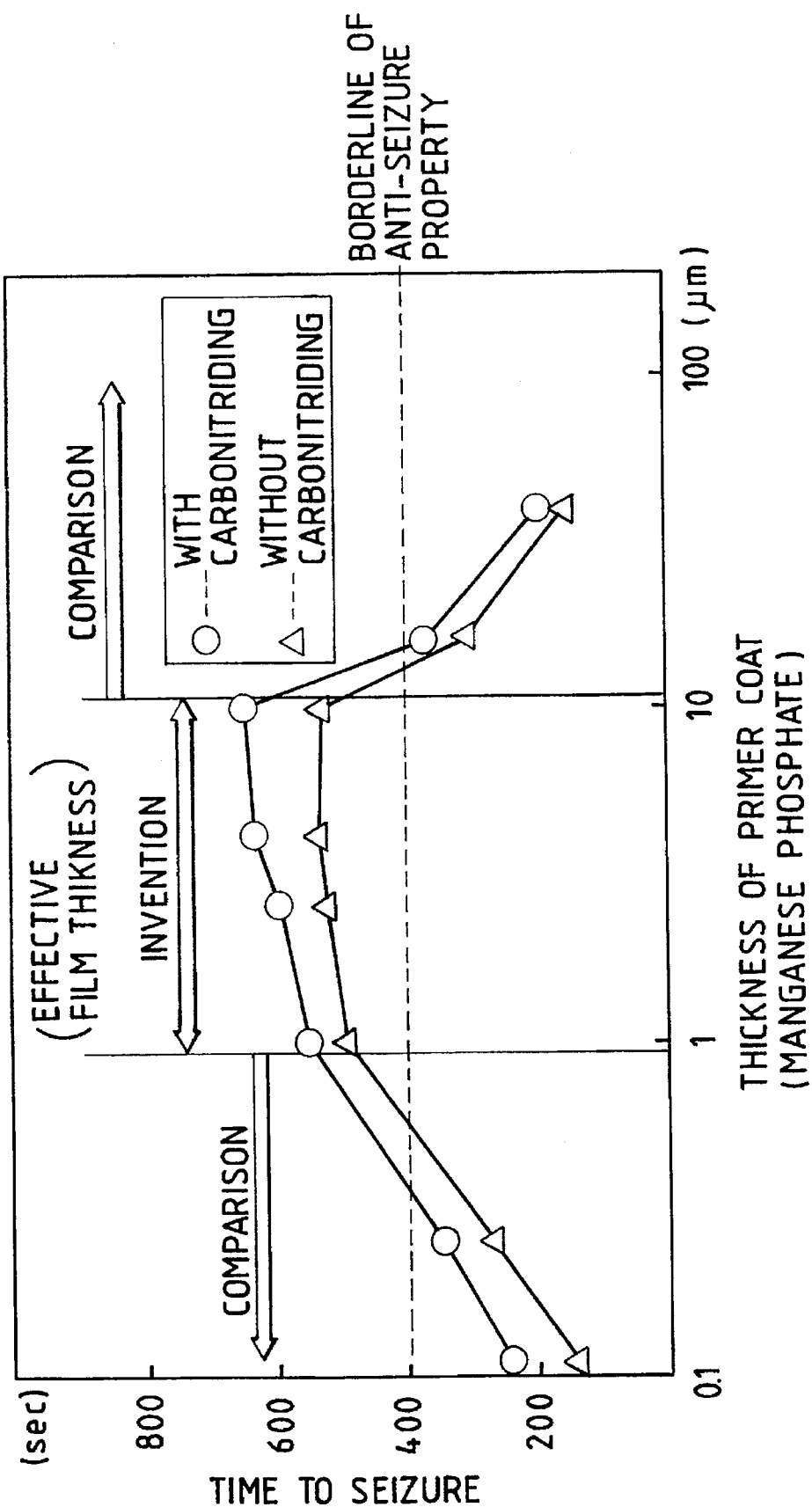
FIG. 22 is a graph illustrating the appropriate thickness of a primer coat to be formed in a modified embodiment of the second embodiment of the present invention.

FIG. 22 is a graph showing the relationship between the thickness of a manganese phosphate coat that was applied as a prime coat on the cage and the time for seizure to occur in a polytetrafluoroethylene (PTFE) film that was coated in a thickness of 2.0 μm by the method to be described below. As is clear from FIG. 22, satisfactory anti-seizure property was realized when the thickness of the manganese phosphate coat was within the range from 1 to 10 μm and its anti-seizure property deteriorated sharply as its thickness departed farther away from the above range. Thus, the minimum thickness of the phosphate coat that is necessary to insure anti-seizure property is 4 μm if the PTFE film is applied by spraying but reduced to 1 μm if it is applied by coating.

The marked deterioration of anti-seizure property which occurs if the thickness of the phosphate coat is outside the range of 1 to 10 μm may be explained as follows. If the coating thickness is less than 1.0 μm, the surface asperities formed are insufficient to provide satisfactory adhesion between the solid lubricant and the substrate surface. If the coating thickness exceeds 10 μm, the surface of the coating becomes so rough that even if it is overlaid with a coating of solid lubricant, it remains rough and the lubricating conditions deteriorate as exemplified by broken oil film on the surface of a cage which is made of the phosphated material. In addition, the dimensional tolerances of the cage also deteriorates. Therefore, in the modification of the examples of the second embodiment of the present invention under consideration, the thickness of the phosphate coat is limited to lie between 1 and 10 μm. Further, manganese phosphate as the priming material for the application of the solid lubricant may be replaced by other phosphates such as zinc phosphate, iron phosphate and calcium phosphate and the results are comparable to the test data that are set forth below.

The modification will now be described on the basis of test data. The sample bearings used in the test were thrust needle bearings (outer diameter of 37 mm and inner diameter of 17 mm, assembled to a width of 7 mm); the cages (to be tested) were made by pressing an SPCC steel sheet to the same shape as shown in FIGS. 21A and 21B; and raceway rings were both made of SUJ 2.

The life tester used in the modification was of the same type as used in the examples of the second embodiment of the present invention (FIG. 7). The test conditions were also the same as in the examples of the second embodiment of the present invention; rotational speed, 5,000 rpm; thrust load, 500 kgf; lubricant, 1 g of PAG oil. Before the test bearings 43a and 43b (FIG. 7) were set in the tester, the raceway rings engaging the race fixing portions were removed and the PAG oil was injected into the pockets of the cage as it was dripped from a syringe.

The cages were prime coated by treatment with manganese phosphate in the following manner. First, the cage was degreased with an alkali washing solution (pH 10) and its surface was conditioned with a solution of sodium nitrite. In order to insure that the crystals of manganese phosphate would form uniformly, the concentration of sodium nitrite was adjusted to 3 g in 1 L of water. After its surface was conditioned in that way, the cage was dipped at 95° C. for 10 min in an aqueous solution of phosphoric acid (11,000 ppm of Mn and 2,000 ppm of Fe) and nitric acid adjusted to pH 3.0; as a result, the crystals of manganese phosphate formed on the surface of the cage in amounts of about 8 g/m$^2$. Coating with Teflon (PTFE or polytetrafluoroethylene) can be accomplished without application of the prime coat in the manner described above; however, priming is desirably performed in order to achieve better anti-seizure property.

Coating with PTFE is performed by applying a liquid suspension of PTFE in an organic solvent which contains polyamideimide as a binder. More specifically, 7,000 samples of cage are put into a metallic container (capacity: 0.7 m$^3$), which is rotated at 15 rpm such that the individual cages contact one another. The previously prepared PTFE suspension is poured into the rotating container and the organic solvent is evaporated by subsequent drying, whereupon a uniform PTFE and binder coat forms on the surface of each cage. Thereafter, a heat treatment is conducted at 200° C. for 1 h to cure the binder.

Forming the PTFE coat from a liquid suspension offers the following advantages over the case where it is applied from an air spray: (1) a smaller amount of the suspension need be used; (2) the throughput per unit time is increased by a factor of about 2 to 5 and this combines with feature (1) to realize reduction in the application cost; and (3) since cages contact one another during the coating operation, an increased stress produces in the coat being formed and the resulting coat is thin and yet has high density; in addition, the coat exhibits such a good adhesion to the substrate surface that despite its small thickness, it maintains comparable sliding property to the spray coated film. It has also been verified that not only the film density but also the adhesion to the substrate surface can be improved by coating the suspension onto the surface of the cages together with media not larger than 10 mm in size.

The cages subjected to the above-described surface treatments were assembled into bearings, which were subjected to a life test with a tester of the type shown in FIG. 7 under the conditions described hereinabove. The results are shown in FIG. 23, which compares the time to seizure and the production cost for the following three cases of treatment: 1) cages were not carbonitrided at all; 2) cages were first carbonitrided and then spray coated with PTFE (according to the already described examples of the second embodiment of the present invention); and 3) cages were first carbonitrided and then coated with a liquid suspension of PTFE (according to the modification of the examples).

Figure 23:
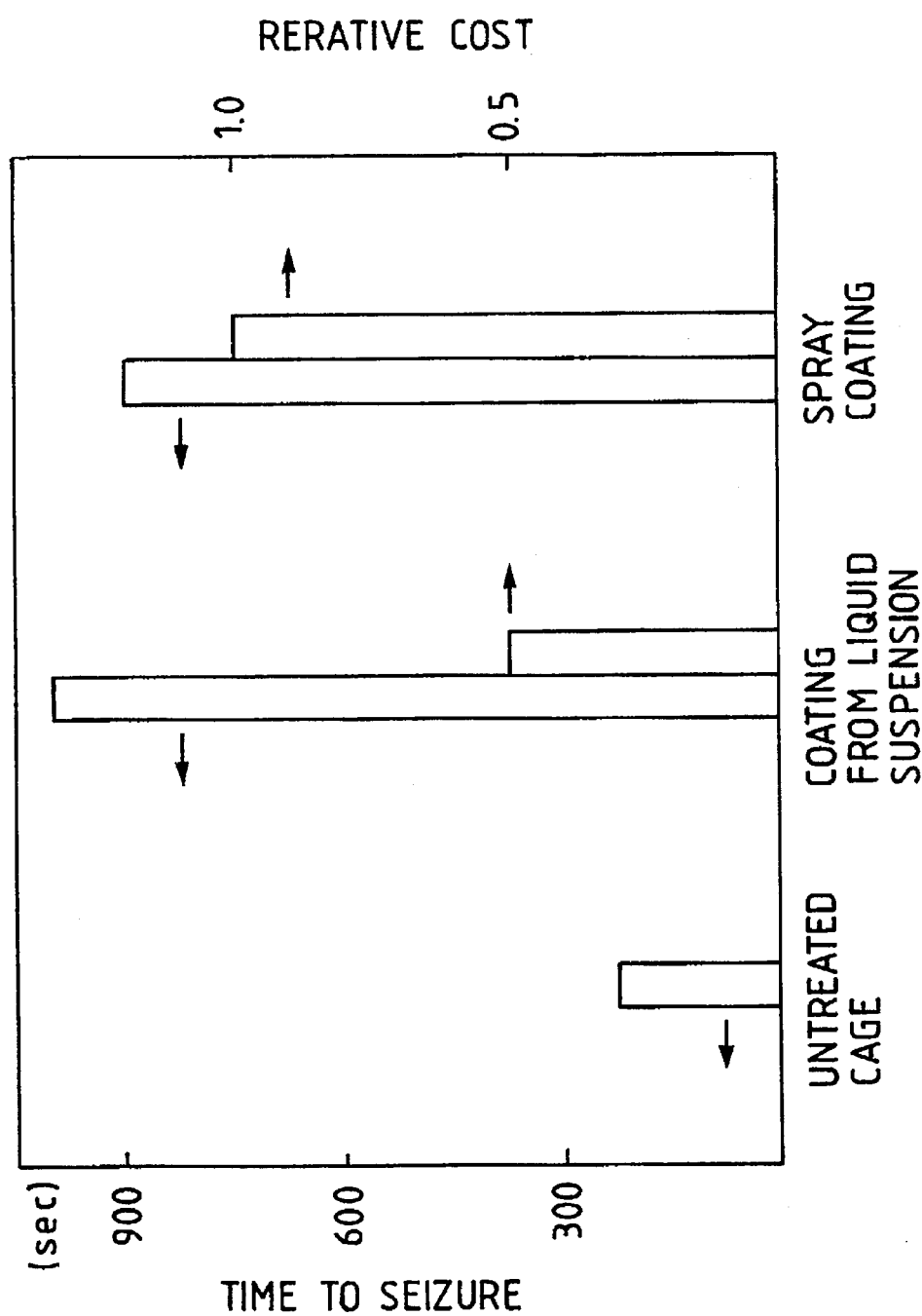
FIG. 23 is a diagram comparing an embodiment of the second embodiment of the present invention with a modification thereof in terms of time to failure and production cost.

As one can see from FIG. 23, the cages that were not given the carbonitriding treatment had the shortest time to seizure. On the other hand, the cages treated according to the examples of the second embodiment of the present invention and their modification had much longer times to seizure. Of the two kinds of cages, those treated according to the modification had the longer time to seizure, probably because they had more dense and stronger coats. The cages of the modification could be produced at about one half the cost of producing the cages according to the examples of the second embodiment of the present invention.

Figure 24:
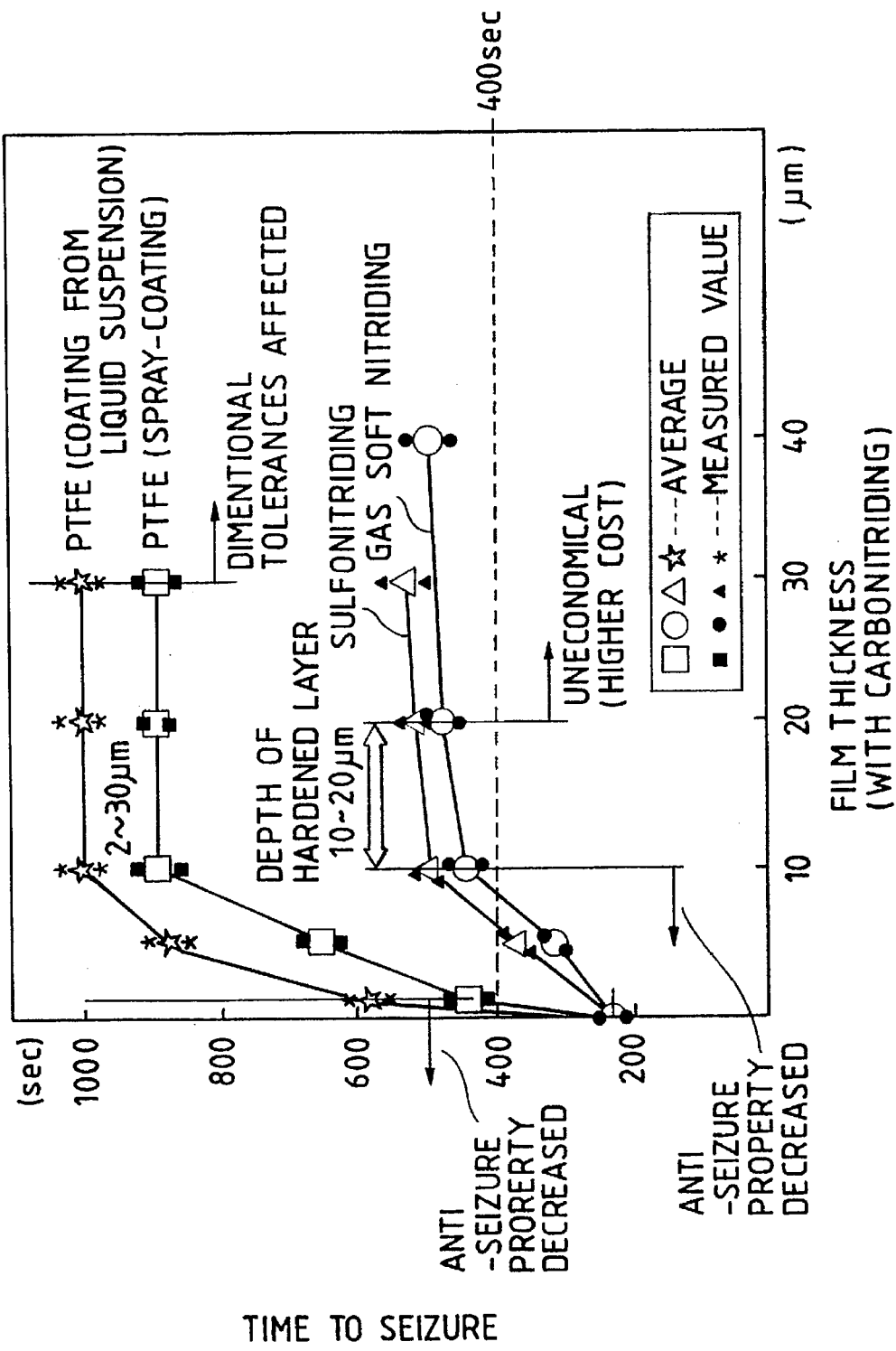
FIG. 24 is a graph showing the results of a life test conducted on cage samples according to a modified embodiment of the second embodiment of the present invention as they were subjected to various surface treatment under varying film thicknesses.

In another experiment, cages were surface treated with PTFE which was coated in varying thicknesses from a liquid suspension (after priming with manganese phosphate coats in thicknesses of 4 to 5 μm). Bearings incorporating the thus treated cages were subjected to a life test using a tester of the type shown in FIG. 7 and the results are shown in FIG. 24 (for the case where carbonitriding was conducted prior to the surface treatments with manganese phosphate and PTFE) and in FIG. 25 (no such pretreatment was conducted). For comparison, FIG. 24 also shows the relationship between the film thickness and the time-to-seizure for the cages that were first carbonitrided and then gas soft nitrided, sulfonitrided or spray coated with PTFE films (after priming with manganese phosphate coats in thicknesses of 4 to 5 μm), and FIG. 25 also shows the relationship between the film thickness and the time-to-seizure for the cages that were not preliminarily carbonitrided but directly gas soft nitrided, sulfonitrided or spray coated with PTFE films.

Figure 25:
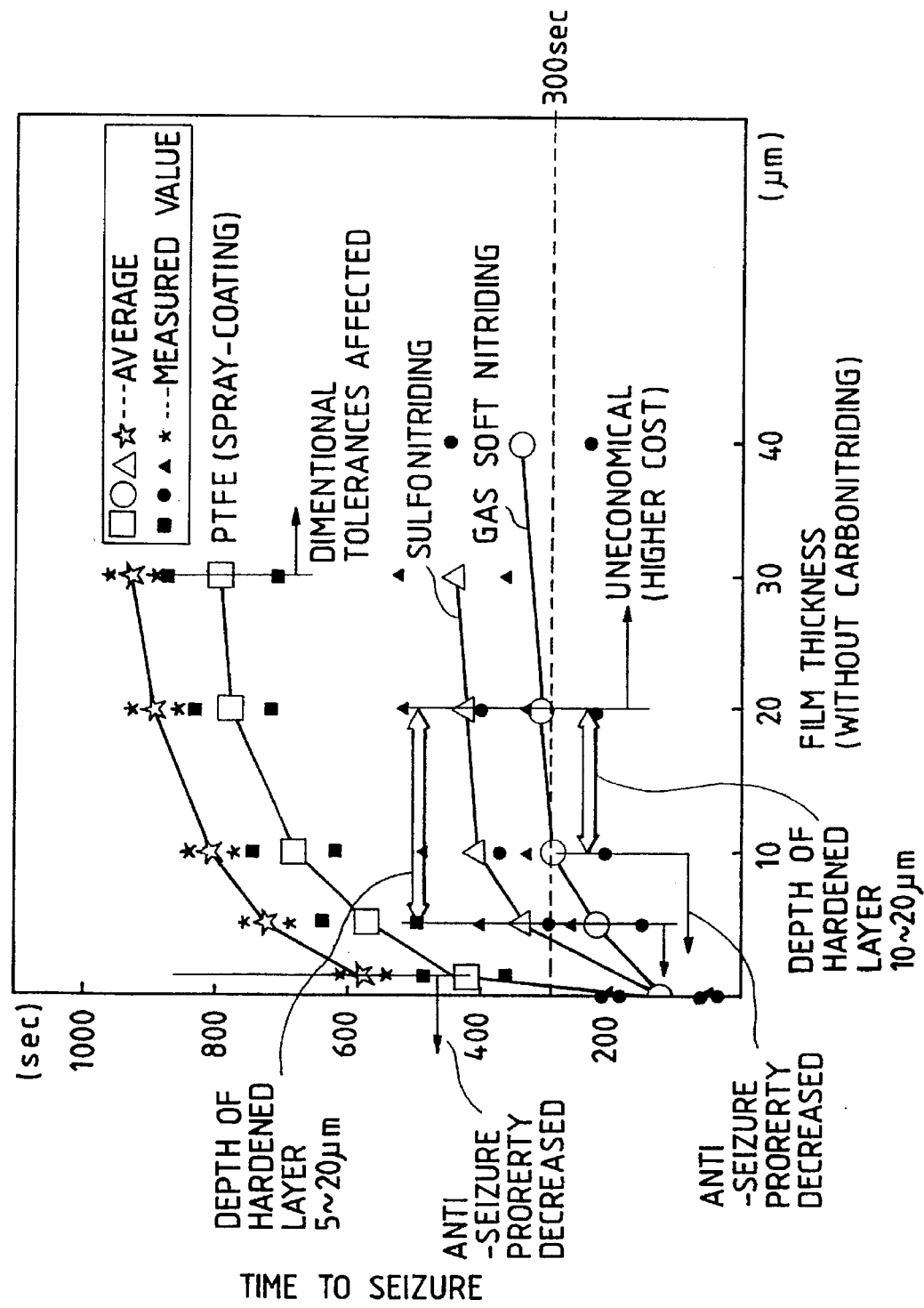
FIG. 25 is a graph showing the results of a life test conducted on cage samples that were not subjected to a carbonitriding treatment before they were subjected to the various surface treatments referred to in FIG. 24.

Comparing the two methods of applying PTFE coats on the basis of the data shown in FIGS. 24 and 25, one can see that irrespective of whether the carbonitriding pretreatment was conducted or not, the cages that were coated with PTFE films from liquid suspensions had longer times to seizure than the cages that were spray coated with PTFE films. Particularly, the PTFE film coated from liquid suspensions according to the modification had practically acceptable, long times to seizure even when the film thickness was less than 10 μm. The reason for this improvement in anti-seizure property is because PTFE films coated from liquid suspensions had greater densities and better adhesion at the interface with the prime coat.

However, if the PTFE film coated from liquid suspensions according to the modification is thinner than 2 μm, the inconsistency in film formation increases the variations in the time to seizure. Therefore, the thickness of PTFE films to be coated from liquid suspensions is desirably at least 2 μm. For the same reason as already described in connection with the spray method, the upper limit for the thickness of the PTFE film coated from liquid suspensions is 30 μm. On account of their higher density than the spray coated films, the PTFE films coated from liquid suspensions flake away if their thickness exceeds 20 μm, and the flakes enter into the space between either race and each of the rolling elements during the assembling of a bearing and this somewhat affects the accuracy of post-assembly torque, acoustic and other inspections. In addition, the motion of the rolling elements within the pockets of the cage is constrained to cause heat generation. As a result, it is liable to reduce, rather than enhance, the effectiveness of the PTFE coat in improving the anti-seizure property of the cage.

Therefore, the thickness of the PTFE film coated from liquid suspensions according to the modification of the examples of the second embodiment of the present invention is preferably within the range from 2 to 30 μm, more preferably from 5 to 20 μm.

Thus, bearing cages made of metallic materials can be provided with much improved anti-seizure properties if they are subjected to the following surface treatments; the cages are given motions such that they contact one another while they are supplied with a liquid dispersion composed of a solid lubricant, a thermosetting resin and an organic solvent, followed by the evaporation of the organic solvent to form a uniform coating of the solid component (e.g. PTFE) on the surface of each cage and, thereafter, the resin component is cured by a heat treatment.

As described above, the thrust needle-shaped roller bearing according to the first embodiment of the present invention is such that the ratio of the length (lr) of each needle-shaped roller to its diameter (Da) is adjusted to lie between 1.2 and 2.0 and that each roller is provided with crowning portions such that the length of contact with each raceway surface is no more than three fourths of the roller length (lr). These dimensional and design features stabilize the attitude of rollers and retain the ease of grinding the rollers and, at the same time, the dynamic torque of the rollers is made as small as possible while insuring that they do not fall away from the cage.

The thrust bearing according to the second embodiment of the present invention is such that nitrogen is contained in the surface of at least one steel member selected from among rolling elements, an inner race and an outer race. This insures against pitting even if the bearing is used in an unfavorable environment such as an alternate fluorocarbon and a working oil and which generates a very small amount of water. As a result, the corrosion resistance of the bearing is improved without increasing the production cost.

The cage of a thrust needle-shaped roller bearing according to the third embodiment of the present invention is such that at least the areas where the cage contacts the rolling elements are partly formed of a resin and this is effective in assuring that the wear due to the friction with the rolling elements is reduced while preventing the occurrence of creep deformation.

What is claimed is:

1. A rolling bearing comprising:
   an outer raceway;
   an inner raceway;
   a plurality of rolling elements interposed between the outer raceway and the inner raceway and lubricated with lubricant; and
   a cage for holding the rolling elements away from each other at the same interval in a rolling direction of the rolling elements,
   the cage including a first layer subjected to a surface treatment of at least one of carbonitriding, phosphating, sulfonitriding, sulfurization and gas soft nitriding, and a second layer formed of at least one of PTFE, $MoS_2$, $WS_2$, Ag and Sn over the first layer, thereby enhancing the cage's resistance to corrosion caused by the lubricant's interaction with water entering from the outside.

2. The rolling bearing of claim 1, wherein the first layer includes a phosphating coating film in thickness of a range from 1 to 10 μm.

3. The rolling bearing of claim 1, wherein the second layer includes a PTFE coating film having a thickness of 2 to 30 μm.

4. The rolling bearing of claim 1, wherein the cage includes a contact portion contacting one of the rolling elements, at least the contact portion being formed of resin.

5. The rolling bearing of claim 1, wherein the rolling bearing comprises a thrust needle-shaped rolling bearing in which the rolling elements comprise needle-shaped rollers which each has a ratio of a roller length to a roller diameter of 1.2 to 2.0 and a contact length one fourths to three fourths of the roller length, the contact length contacting one of the outer and inner raceways.

6. The rolling bearing of claim 1, wherein at least one of the outer raceway, the inner raceway, the rolling elements and the cage includes a carbonitrided surface with the nitrogen concentration being set between 0.08 and 0.6 wt %.

7. The rolling bearing of claim 1, wherein at least one of the outer raceway, the inner raceway, the rolling elements and the cage includes a surface roughness of 0.05 Ra or less.

8. The rolling bearing of claim 1, wherein the first layer comprises a coating film selected from the group consisting of a film of 5 to 20 μm by the sulfonitriding, a film of 5 to 20 μm by the sulfurization, and a film of 10 to 20 μm by the gas soft nitriding.

9. The rolling bearing of claim 1, wherein the second layer comprises a PTFE coating film formed by at least one of coating and spraying liquid suspension.

10. The rolling bearing of claim 1, wherein the lubricant has a tendency to absorb moisture.

* * * * *